(12) United States Patent
Muendel et al.

(10) Patent No.: US 10,656,334 B2
(45) Date of Patent: *May 19, 2020

(54) ROTARY OPTICAL BEAM GENERATOR

(71) Applicant: Lumentum Operations LLC, Milpitas, CA (US)

(72) Inventors: Martin H. Muendel, Oakland, CA (US); James J. Morehead, Oakland, CA (US); Vincent Petit, Cupertino, CA (US); Richard D. Faulhaber, San Carlos, CA (US)

(73) Assignee: Lumentum Operations LLC, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/457,018

(22) Filed: Jun. 28, 2019

(65) Prior Publication Data

US 2019/0317280 A1 Oct. 17, 2019

Related U.S. Application Data

(63) Continuation-in-part of application No. 15/802,897, filed on Nov. 3, 2017, now Pat. No. 10,429,584.

(60) Provisional application No. 62/425,431, filed on Nov. 22, 2016, provisional application No. 62/715,040, filed on Aug. 6, 2018.

(51) Int. Cl.
*G02B 6/44* (2006.01)
*G02B 6/14* (2006.01)
*G02B 6/024* (2006.01)
*G02B 6/26* (2006.01)

(52) U.S. Cl.
CPC ............... *G02B 6/14* (2013.01); *G02B 6/024* (2013.01); *G02B 6/262* (2013.01); *G02B 6/264* (2013.01); *C03B 2203/20* (2013.01)

(58) Field of Classification Search
USPC .................................................. 385/100–104
See application file for complete search history.

(56) References Cited

U.S. PATENT DOCUMENTS

| 4,962,994 A | 10/1990 | Someda et al. |
| 5,290,280 A | 3/1994 | Daikuzono et al. |
| 5,701,376 A | 12/1997 | Shirasaki et al. |

(Continued)

FOREIGN PATENT DOCUMENTS

| CN | 103969739 A | 8/2014 |
| EP | 0227366 A2 | 7/1987 |

(Continued)

OTHER PUBLICATIONS

Alekseev K.N., et al., "Twisted Optical Fibers Sustaining Propagation of Optical Vortices," Optics and Spectroscopy, Jan. 2005, vol. 98 (1), pp. 53-60.

(Continued)

*Primary Examiner* — Eric Wong
(74) *Attorney, Agent, or Firm* — Harrity & Harrity, LLP

(57) ABSTRACT

An optical fiber device may include a unitary core including a primary section and a secondary section, wherein at least a portion of the secondary section is offset from a center of the unitary core, wherein the unitary core twists about an axis of the optical fiber device along a length of the optical fiber device, and wherein a refractive index of the primary section is greater than a refractive index of the secondary section; and a cladding surrounding the unitary core.

20 Claims, 12 Drawing Sheets

(56) References Cited

U.S. PATENT DOCUMENTS

| | | |
|---|---|---|
| 7,019,902 B2 | 3/2006 | Deile et al. |
| 7,424,193 B2 | 9/2008 | Galvanauskas et al. |
| 8,111,957 B2 | 2/2012 | Alfano et al. |
| 8,946,586 B2 | 2/2015 | Bea et al. |
| 2005/0247479 A1 | 11/2005 | Kenny et al. |
| 2006/0050392 A1 | 3/2006 | Schulz |
| 2008/0115958 A1 | 5/2008 | Stutzman et al. |
| 2013/0148925 A1 | 6/2013 | Muendel et al. |
| 2013/0301998 A1 | 11/2013 | Hayashi et al. |
| 2017/0299806 A1 | 10/2017 | Kopp et al. |
| 2017/0370704 A1 | 12/2017 | Froggatt et al. |
| 2018/0088343 A1 | 3/2018 | Kliner et al. |
| 2018/0088357 A1 | 3/2018 | Kliner et al. |
| 2018/0088358 A1 | 3/2018 | Kliner et al. |
| 2018/0143377 A1 | 5/2018 | Muendel et al. |

FOREIGN PATENT DOCUMENTS

| | | |
|---|---|---|
| WO | 2004027476 A1 | 4/2004 |
| WO | 2009010043 A2 | 1/2009 |

OTHER PUBLICATIONS

Alexeyev C.N., et al., "Filter of Optical Vortices: Highly Twisted High-Birefringence Optical Fibers," Optics Letters, Jan. 2006, vol. 31 (1), pp. 8-10.

Beijersbergen M.W., et al., "Helical-Wavefront Laser Beams Produced With a Spiral Phaseplate," Optics Communications, Dec. 1994, vol. 112 (5-6), pp. 321-327.

Dawei, Y., et al., "Spatial Mode Rotator Based on Mechanically Induced Twist and Bending in Few-Mode Fibers," Visual Communications and Image Processing, Jan. 15, 2015, vol. 9389, 8 pages.

Extended European Search Report for Application No. EP17202443.2, dated Apr. 20, 2018, 9 pages.

Kennedy S.A., et al., "Creation of Laguerre-Gaussian Laser Modes Using Diffractive Optics," Physical Review A, 2002, vol. 66 (4), pp. 043801.1-043801.5.

Lee W.M., et al., "Experimental Observation of Optical Vortex Evolution in a Gaussian Beam With an Embedded Fractional Phase Step," Optics Communications, Sep. 2004, vol. 239 (1-3), pp. 129-135.

Napiorkowski M., et al., "Rigorous Simulations of a Helical Core Fiber by the Use of Transformation Optics Formalism," Optics Express, Sep. 2014, vol. 22 (19), pp. 23108-23120.

Scipioni M., et al., "Mode Purity Comparison of Optical Vortices Generated by a Segmented Deformable Mirror and a Static Multi-level Phase Plate," Applied Optics, Oct. 2008, vol. 47 (28), pp. 5098-5102.

Strohaber J., et al., "Ultrashort Intense-Field Optical Vortices Produced With Laser-Etched Mirrors," Applied Optics, Dec. 2007, vol. 46 (36), pp. 8583-8590.

Tyson R.K., et al., "Generation of an Optical Vortex With a Segmented Deformable Mirror," Applied Optics, Nov. 2008, vol. 47 (33), pp. 6300-6306.

Wang P., et al., "Cladding-Pumped Yb-Doped Helical-Core Fibre Lasers and Amplifiers," European Conference on Lasers and Electro-Optics, 2005, 1 page.

Wang P., et al., "Efficient Single-Mode Operation of a Cladding Pumped Ytterbium-Doped Helical-Core Fiber Laser," Optics Letters, Jan. 2006, vol. 31 (2), pp. 226-228.

Wang P., et al., "Helical-Core Ytterbium-Doped Fibre Laser," Electronics Letters, Oct. 2004, vol. 40 (21), pp. 1325-1326.

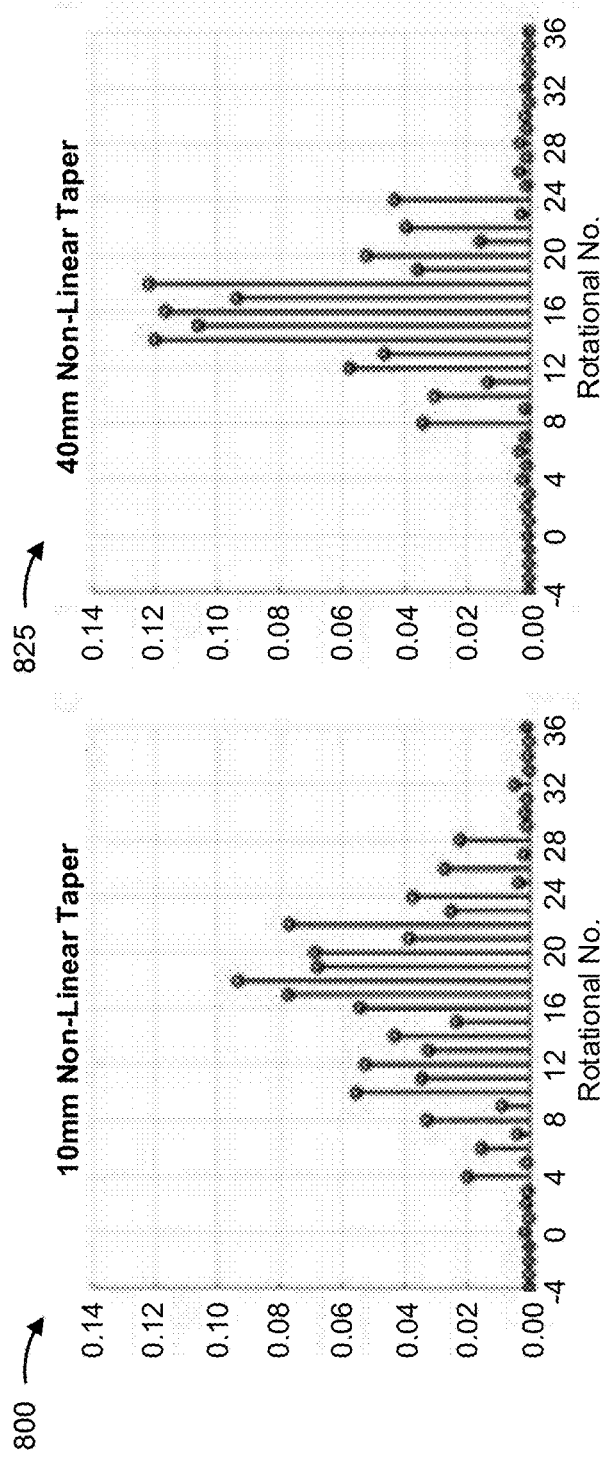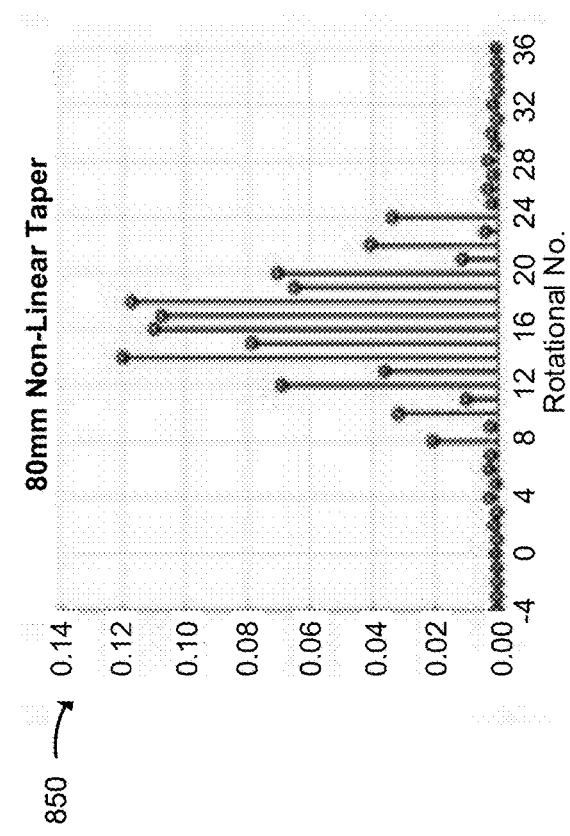
FIG. 8A
FIG. 8B
FIG. 8C

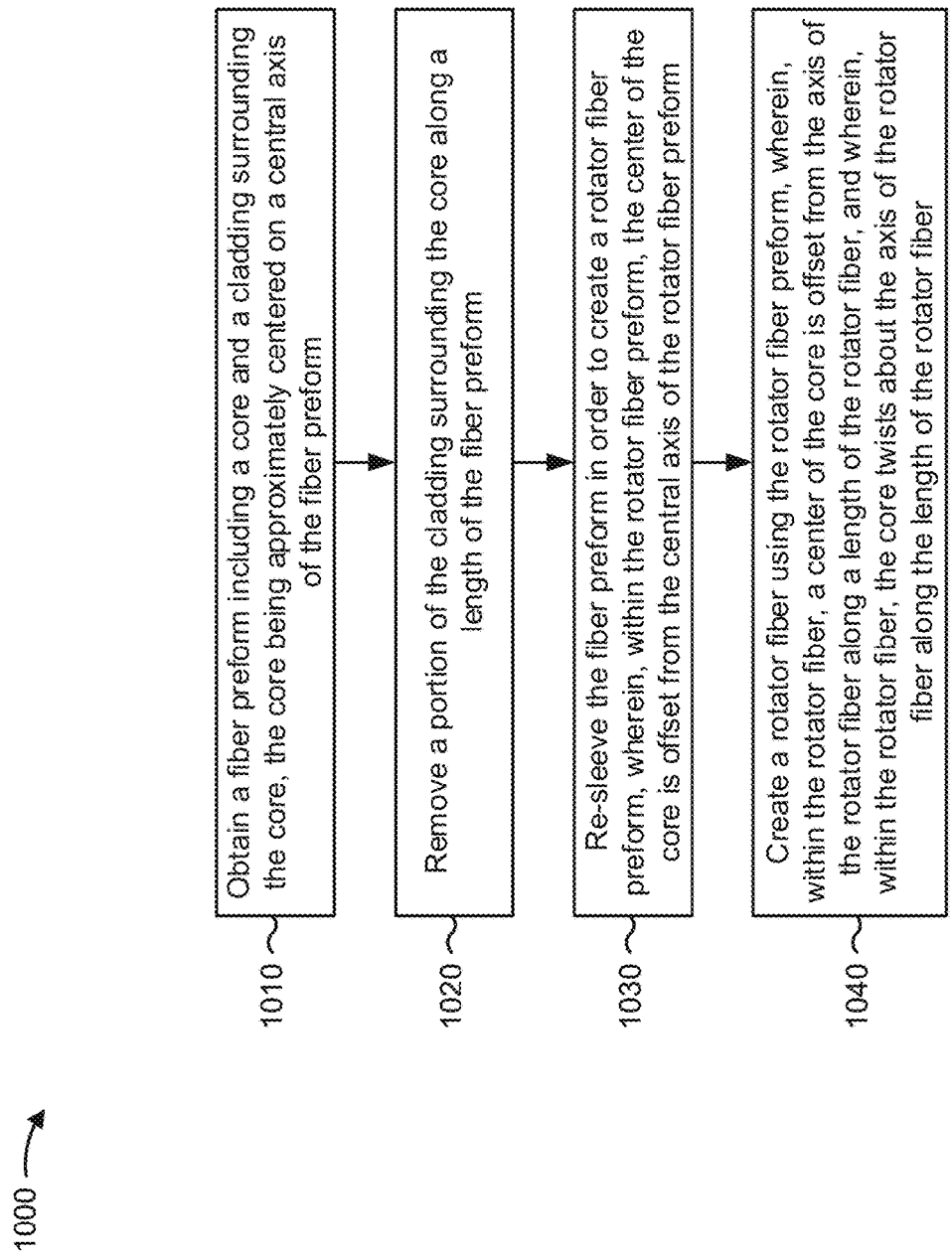

ROTARY OPTICAL BEAM GENERATOR

RELATED APPLICATION

This application is a continuation-in-part (CIP) of U.S. patent application Ser. No. 15/802,897, filed on Nov. 3, 2017, which claims priority under 35 U.S.C. § 119 to U.S. Provisional Patent Application No. 62/425,431 filed on Nov. 22, 2016, the contents of which are incorporated by reference herein in their entirety.

This application claims priority under 35 U.S.C. § 119 to U.S. Provisional Patent Application No. 62/715,040, filed on Aug. 6, 2018, the content of which is incorporated by reference herein in its entirety.

TECHNICAL FIELD

The present disclosure relates to an optical fiber device for generating an optical beam with an annular beam shape and, more particularly, to an optical fiber device for generating a rotary optical beam with an annular beam shape directly in an optical fiber (i.e., without using free-space optics).

BACKGROUND

A beam profile of an optical beam has a significant impact on processing performance associated with material processing performed using the optical beam. For example, an optical beam with an annular beam profile can enable superior metal cutting. However, beam profiles of most fiber-delivered optical beams are relatively simplistic. For example, the beam profile may be a Gaussian or near-Gaussian profile for a low-beam-parameter-product (BPP) laser (e.g., a BPP of less than or equal to approximately 3 millimeters times milliradians (mm-mrad)) that can be used for processing thin sheet metal (e.g., sheet metal with a thickness of less than or equal to approximately 3 mm) using a tightly focused optical beam. As another example, the beam profile may be a top-hat (sometimes referred to as a flattop) profile for a high BPP laser (e.g., a BPP of greater than approximately 3 mm-mrad) that can be used for processing thick sheet metal (e.g., sheet metal with a thickness greater than approximately 3 mm) using a larger beam.

SUMMARY

According to some possible implementations, an optical fiber device may include a unitary core including a primary section and a secondary section, wherein at least a portion of the secondary section is offset from a center of the unitary core, wherein the unitary core twists about an optical axis of the optical fiber device along a length of the optical fiber device, and wherein a refractive index of the primary section is greater than a refractive index of the secondary section; and a cladding surrounding the unitary core.

According to some possible implementations, an optical fiber device, including a unitary core including a primary section, wherein the primary section of the unitary core has a non-circular shape, wherein the unitary core twists about an optical axis of the optical fiber device along a length of the optical fiber device; and a cladding surrounding the unitary core.

According to some possible implementations, a method may include: receiving, by a rotator fiber, an optical beam at a first end of the rotator fiber, wherein the rotator fiber includes a unitary core that twists about an optical axis of the rotator fiber along a length of the rotator fiber; at least partially converting, by the rotator fiber, the optical beam to a rotary optical beam, wherein the optical beam is at least partially converted to the rotary optical beam as a result of the unitary core being twisted about the optical axis; and outputting, by the rotator fiber, the rotary optical beam.

According to some possible implementations, a method may include: fabricating a rotator fiber preform having a unitary core with a refractive index structure that angularly varies with respect to a center of the rotator fiber preform; consolidating the rotator fiber preform in order to create a consolidated rotator fiber preform; concurrently drawing and spinning the consolidated rotator fiber preform in order to create a spun rotator fiber; and tapering the spun rotator fiber in order to create a tapered spun rotator fiber, wherein, within the tapered spun rotator fiber, the unitary core rotates about an optical axis of the tapered spun rotator fiber along a length of the tapered spun rotator fiber.

According to some possible implementations, a method may include: fabricating a rotator fiber preform including a unitary core with a refractive index structure that angularly varies with respect to a center of the rotator fiber preform; consolidating the rotator fiber preform in order to create a consolidated rotator fiber preform; drawing the consolidated rotator fiber preform in order to create a drawn rotator fiber; and twisting the drawn rotator fiber in order to create a twisted rotator fiber, wherein, within the twisted rotator fiber, the unitary core rotates about an optical axis of the twisted rotator fiber along a length of the twisted rotator fiber.

According to some possible implementations, an optical fiber device may include a core section that twists about an axis of the optical fiber device along a length of the optical fiber device, wherein a center of the core section is offset from the axis of the optical fiber device along the length of the optical fiber device, wherein a rate of twist at which the core section twists about the axis increases from a first rate of twist at a first end of the optical fiber device to a second rate of twist at a second end of the optical fiber device, and wherein the core section being twisted about the axis is to cause an optical beam, launched at the first end of the optical fiber device, to be at least partially converted to a rotary optical beam at a second end of the optical fiber device; and a cladding surrounding the core section.

According to some possible implementations, a method may include receiving, by a rotator fiber, an optical beam at a first end of the rotator fiber, wherein the rotator fiber includes a core section that twists about an axis of the rotator fiber along a length of the rotator fiber such that a center of the core section is offset from the axis of the rotator fiber along the length of the rotator fiber, wherein a rate of twist at which the core section twists about the axis increases from a first rate of twist at a first end of the rotator fiber to a second rate of twist at a second end of the rotator fiber; at least partially converting, by the rotator fiber, the optical beam to a rotary optical beam, wherein the optical beam is at least partially converted to the rotary optical beam as a result of the core section being twisted about the axis; and outputting, by the rotator fiber, the rotary optical beam.

According to some possible implementations, an annular beam generator may include an optical fiber device comprising a core section that twists about an axis of the optical fiber device along a length of the optical fiber device, the core section being offset from the axis of the optical fiber device along the length of the optical fiber device, wherein a rate of twist at which the core section twists about the axis increases along the length of the optical fiber device from a first end of the optical fiber device to a second end of the optical fiber device; and a cladding surrounding the core section.

According to some possible implementations, a method may include obtaining a fiber preform including a core and a cladding surrounding the core, the core being approximately centered on a central axis of the fiber preform; removing a portion of the cladding surrounding the core along a length of the fiber preform; re-sleeving the fiber preform in order to create a rotator fiber preform, wherein, within the rotator fiber preform, the center of the core is offset from the central axis of the rotator fiber preform; and creating a rotator fiber using the rotator fiber preform, wherein, within the rotator fiber, a center of the core is offset from the axis of the rotator fiber along a length of the rotator fiber, and wherein, within the rotator fiber, the core twists about the axis of the rotator fiber along the length of the rotator fiber.

According to some possible implementations, a method may include creating an opening along a length of a cladding rod, the opening being offset from a central axis of the cladding rod; inserting a core rod in the opening along the length of the cladding rod; consolidating the core rod and the cladding rod in order to create a consolidated rotator fiber preform; and creating a rotator fiber using the rotator fiber preform, wherein, within the rotator fiber, a center of the core is offset from an axis of the rotator fiber along a length of the rotator fiber, and wherein, within the rotator fiber, the core twists about the axis of the rotator fiber along the length of the rotator fiber.

BRIEF DESCRIPTION OF THE DRAWINGS

FIGS. 8A-8C are diagrams associated with example simulations using various taper lengths of the rotator fiber described herein;

FIGS. 10 and 11 are flow charts of example processes for fabricating a rotator fiber with an offset unitary core, as described herein.

DETAILED DESCRIPTION

The following detailed description of example implementations refers to the accompanying drawings. The same reference numbers in different drawings may identify the same or similar elements. The implementations described below are merely examples and are not intended to limit the implementations to the precise forms disclosed. Instead, the implementations were selected for description to enable one of ordinary skill in the art to practice the implementations.

As described above, beam shapes of conventional fiber-delivered optical beams are relatively simplistic (e.g., having a Gaussian or near-Gaussian profile, a top-hat profile, and/or the like). Generating an optical beam with a comparatively more advanced beam shape, such as an annular beam shape (i.e., a ring-shaped beam) generally takes expensive, specialized, alignment-sensitive free-space optics, such as axicons, spiral phase plates, and/or the like. Moreover, such optics typically need to be located in a processing head, distal to a fiber associated with delivering the optical beam. The processing head is an opto-mechanical assembly that is subject to acceleration and contamination (e.g., from smoke, metal debris, dust, and/or the like), and is therefore an undesirable location for expensive, alignment-sensitive, bulky, and/or heavy optical elements.

Further, conventional techniques for generating an optical beam with an annular beam shape typically provide an optical beam with poor beam quality. For example, the conventional techniques may generate an optical beam with an excessively high BPP, an excessive amount of power in a middle of the annulus, diffuse beam edges (e.g., with a relatively long radial tail of power that causes poor processing quality), and/or the like.

Some implementations described herein provide an optical fiber device for generating an optical beam with an annular beam shape directly in an optical fiber (i.e., without any free-space optics). More specifically, the generated optical beam is a rotary optical beam (i.e., an optical beam that propagates in the optical fiber in a helical direction), thereby generating an optical beam with an annular beam shape. In some implementations, the rotary character of the optical beam can be preserved (e.g., when the optical beam exits the optical fiber) such that a laser spot projected from the optical fiber onto a workpiece, for example, shows an annular beam profile with sharp edges and high beam quality. In this way, an optical beam with an annular beam shape may be generated directly in the optical fiber, thereby facilitating improved material processing.

Figure 1A:
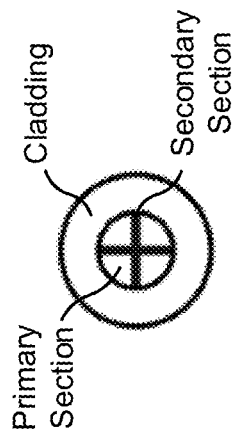
FIGS. 1A and 1B are diagrams of an overview associated with an example rotator fiber for generating rotary optical beam described herein.
Figure 1B:
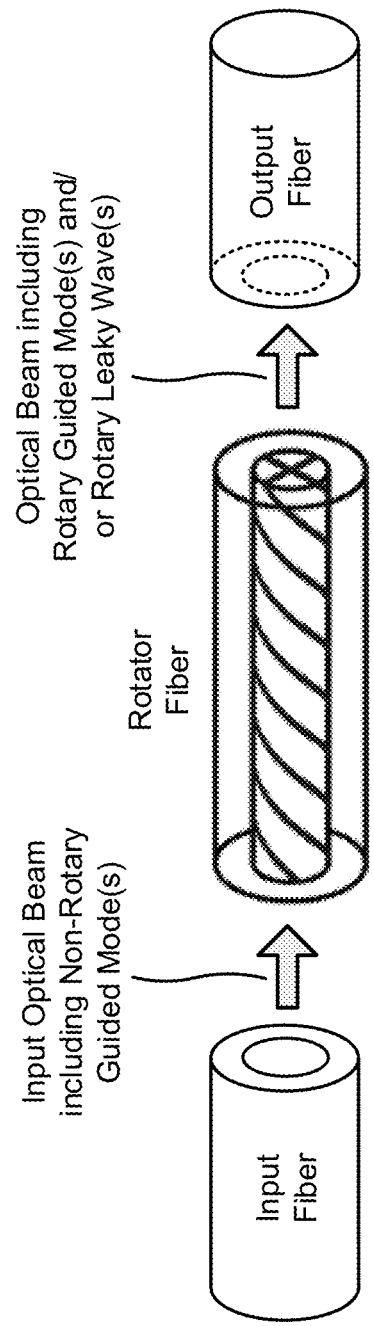

FIGS. 1A and 1B are diagrams of an overview associated with an example 100 of a rotator fiber for generating a rotary optical beam, described herein.

An optical fiber device for generating a rotary optical beam (referred to herein as a rotator fiber) may include a unitary core, which may comprise a primary section and a secondary section, where at least a portion of the secondary section is offset from a center of the unitary core. An example cross-section of such a rotator fiber is shown in FIG. 1A. In the example shown in FIG. 1A, the secondary section is arranged such that the secondary section (e.g., a section with a "+" shaped cross-section) separates the primary section into four sections. As further shown, the rotator fiber may further include a cladding region that surrounds the unitary core.

As shown in FIG. 1B, the unitary core (i.e., the primary section and the secondary section) may twist about an optical axis of the rotator fiber (e.g., a center of the unitary core) along a length of the rotator fiber. In some implementations, the unitary core being twisted about the optical axis causes an input optical beam (e.g., a non-rotary optical beam), launched at an input end of the rotator fiber, to be at least partially converted to a rotary optical beam at an output end of the rotator fiber, as described in further detail below.

As further shown in FIG. 1B, in some implementations, the rotator fiber may be disposed between an input fiber and an output fiber. In some implementations, the input fiber, the rotator fiber, and the output fiber may be fusion-spliced together (e.g., using a conventional fiber fusion splicing technology).

In operation, the rotator fiber may receive an input optical beam from the input fiber. As shown, the input optical beam may include light propagating in one or more non-rotary guided modes. As the light propagates through the rotator fiber, and due to the twist of the unitary core along the length of the rotator fiber, the rotator fiber generates a rotary optical beam from the input optical beam. In other words, the rotator fiber may at least partially convert the input optical beam to a rotary optical beam (e.g., by at least partially converting the one or more non-rotary guided modes to at least one rotary guided mode and/or at least one rotary leaky wave). Thus, as indicated in FIG. 1B, the rotary optical beam may include light propagating in at least one rotary guided mode and/or at least one rotary leaky wave.

In some implementations, due to the light propagating in the at least one rotary guided mode and/or the at least one rotary leaky wave, the rotary optical beam has an annular beam shape. The rotary optical beam can be launched via the output fiber (e.g., for use in material processing, such as metal cutting). Here, the rotary character of the optical beam can be preserved such that a laser spot projected from the output fiber shows an annular beam profile with sharp edges and high beam quality. In this way, an optical fiber device may generate a rotary optical beam with an annular beam shape directly in an optical fiber (i.e., without any free-space optics), thereby facilitating improved material processing (e.g., as compared to the conventional techniques described above).

As indicated above, FIGS. 1A and 1B are provided merely as examples. Other examples are possible and may differ from what is described with regard to FIGS. 1A and 1B. For example, while the unitary core shown in FIGS. 1A and 1B comprises a primary section and a secondary section, other implementations are possible, such as a unitary core including only a primary section (e.g., a primary section with a non-circular shape, a primary section that is offset from the optical axis, and/or the like). Additional details regarding example designs of the rotator fiber are described below.

Figure 2:
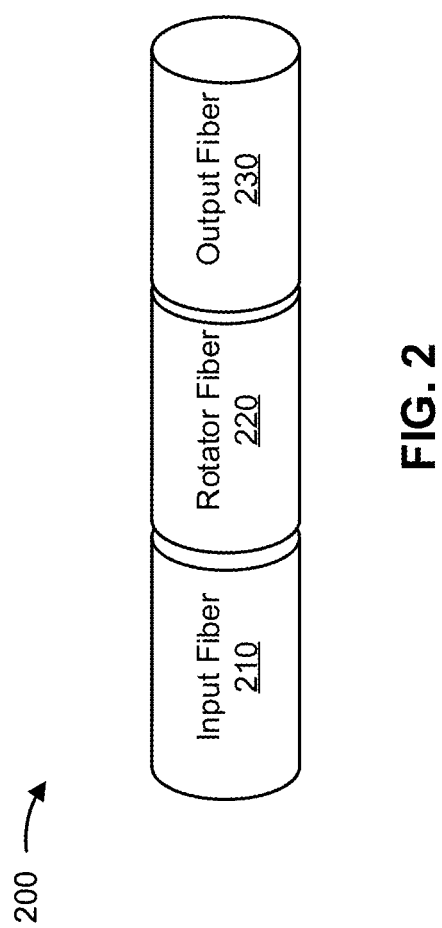
FIG. 2 is a diagram of an example environment in which a rotator fiber for generating a rotary optical beam may be implemented.

FIG. 2 is a diagram of an example environment 200 in which a rotator fiber for generating a rotary optical beam may be implemented. As shown in FIG. 2, environment 200 may include an input fiber 210, a rotator fiber 220, and an output fiber 230.

Input fiber 210 includes an optical fiber for launching an input optical beam (e.g., an input laser beam) to rotator fiber 220. In some implementations, input fiber 210 may be a step-index optical fiber or a graded-index optical fiber, and may be designed to carry an optical beam near an optical fiber axis of input fiber 210. In some implementations, input fiber 210 may be connected to an output fiber of a fiber laser, or input fiber 210 can itself be an output fiber of a fiber laser. Alternatively, in some cases, the input optical beam may be launched from free-space into input fiber 210. In such a case, input fiber 210 may actually be omitted, and the input optical beam may be launched straight into rotator fiber 220 (e.g., rather than input fiber 210).

Depending on a system design and a design of input fiber 210, the input optical beam launched by input fiber 210 may be in the form of guided modes of a core of input fiber 210, in some implementations. In the case of a step-index fiber, the guided modes may have a characteristic half-divergence angle in air ($\theta$) measured using the second-moment method and satisfying the cutoff condition:

$\sin(\theta) < NA$, where $NA = \sqrt{(n_1^2 - n_2^2)}$ is a numerical aperture and $n_1$ and $n_2$ are refractive indices of the core of input fiber 210 and a cladding of input fiber 210, respectively. In the case of input fiber 210 being a non-step-index optical fiber, the guided modes may be defined analogously using conventional solutions of a wave equation in fibers.

Whether input fiber 210 is a step-index optical fiber or a non-step-index optical fiber, the guided modes of weakly-guiding, circular-core fibers can be the so-called LP-modes, $LP_{lm}$, where l, the rotational quantum number, is an integer that is greater than or equal to zero ($l \geq 0$), and m, the radial quantum number, is an integer that is greater than or equal to one ($m \geq 1$). The upper limits of l and m may be determined by the cutoff condition associated with the refractive-index profile of input fiber 210 described above.

In some implementations, the input optical beam launched by input fiber 210 may be a single mode optical beam or a multi-mode optical beam, and may be a polarized optical beam or an un-polarized optical beam. In a case where the input optical beam is polarized, the input optical beam may be circularly polarized since a circular polarization may be better maintained in rotator fiber 220 and/or output fiber 230 (e.g., as compared to a linear polarization or an elliptical polarization). In some implementations, if a linearly-polarized output optical beam is desired, then the linear polarization may be generated from the circular polarization after a termination of output fiber 230 using, for example, a quarter-wave plate.

Rotator fiber 220 includes an optical fiber device for at least partially converting an input optical beam, with a first rotational state, to an output optical beam with a second rotational state. For example, rotator fiber 220 may include an optical fiber device for at least partially converting an optical beam (e.g., a non-rotary optical beam) to a rotary optical beam. In some implementations, rotator fiber 220 may be relatively short in length (e.g., with a length of less than 1m, but greater than 1 mm), whereas lengths of input fiber 210 and output fiber 230 may be dictated by the optical system in which rotator fiber 220 is deployed (e.g., in a range from approximately 0.5 m to approximately 100 m). Design aspects associated with the rotary optical beam generated by rotator fiber 220 are described in the following paragraphs, while design aspects associated with rotator fiber 220 are described below with regard to FIGS. 4A, 4B, 9A, and 9B.

In some implementations, the rotary optical beam may include light propagating in one or more rotary guided modes. Rotary guided modes are defined as modes having $l \geq 1$ and one definite rotation direction. For a mode to have one definite rotation direction is defined as follows. For modes with $l \geq 1$, LP-modes can be expressed as modes with either $\sin(l\phi)$ and $\cos(l\phi)$ dependence, or $e^{\pm(il\phi)}$ dependence, where $\phi$ is an angular coordinate. Modes with $l = 0$ have no angular dependence. The sine and cosine modes are standing waves in the angular direction, with angular nodes and with zero net rotation direction. The complex-exponential modes are angular traveling waves without angular nodes. These modes have one definite rotation direction (e.g., clockwise or counterclockwise), which is selected by the choice of ($\pm$) or ($-$) in $e^{\pm(il\phi)}$.

In some implementations, for the rotary guided modes in the rotary optical beams described herein, m may be equal to 1 ($m=1$) or may be significantly less than l (e.g., less than approximately 50% of l, less than approximately 20% of l, and/or the like). In some implementations, using a comparatively low value of m (as compared to l) may ensure that the rotary guided mode will have a pronounced annular shape. In particular, a rotary guided mode with m=1 has no radial nodes other than the zero at the origin. In other words, the rotary guided mode with m=1 is a single ring (whereas higher values of m correspond to rotary guided modes with m concentric rings). In some implementations, angular traveling waves with one definite rotation direction, no angular nodes, and/or zero or few radial nodes may be generated by rotator fiber 220.

Figure 3:
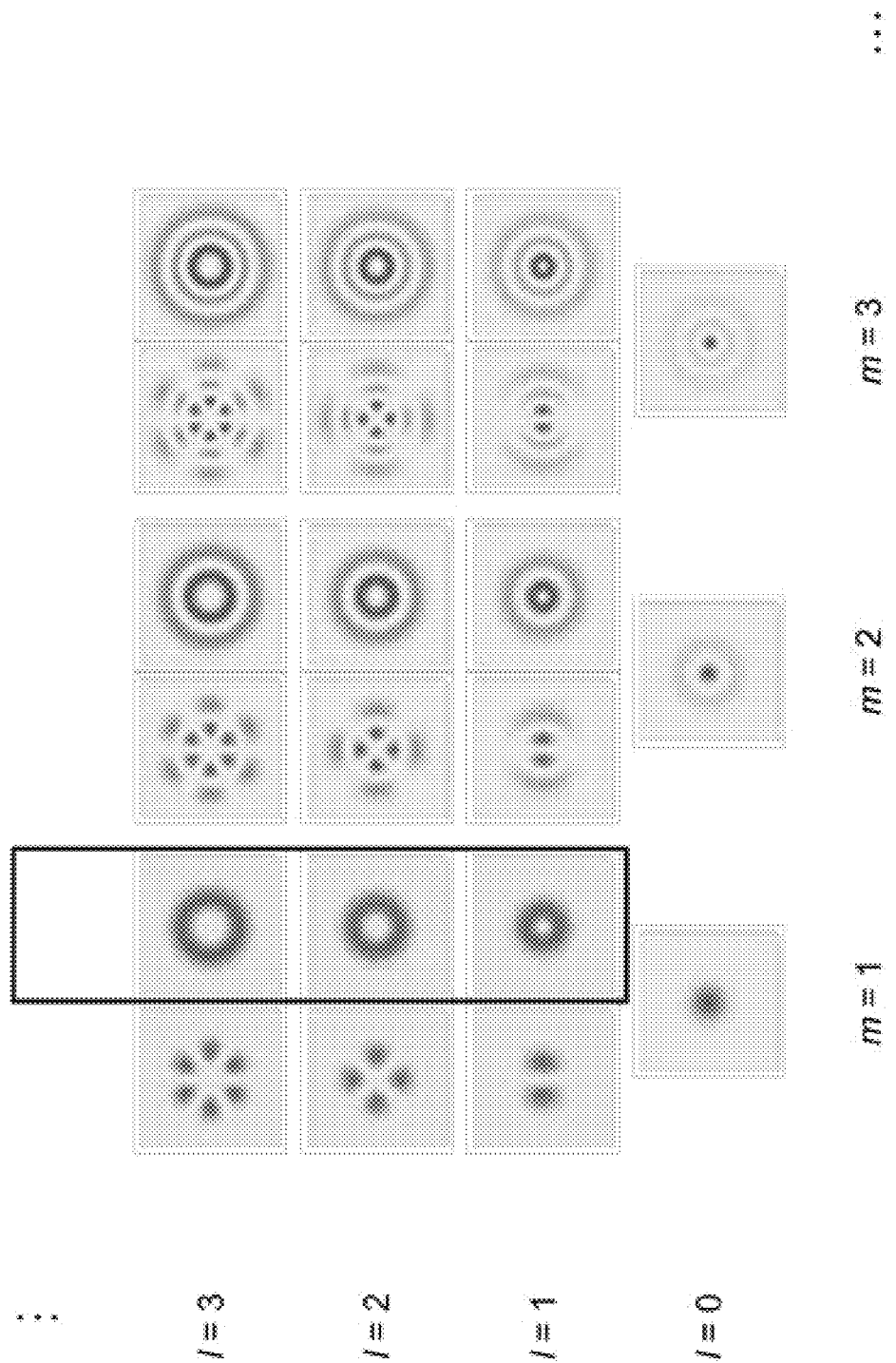
FIG. 3 is a diagram illustrating example transverse near-field intensity patterns of various low-order guided modes $LP_{lm}$ of a parabolic-graded-index fiber below cutoff.

FIG. 3 is a diagram illustrating example transverse near-field intensity patterns of various low-order guided modes $LP_{lm}$ of a parabolic-graded-index fiber below cutoff. Modes of optical fibers with other rotationally-symmetric refractive-index profiles, such as a step-index optical fiber, may have similar intensity patterns as those shown in FIG. 3. In FIG. 3, both the angular-standing wave (cosine) and traveling wave modes for each m are shown for l≥1, in the left and right columns corresponding to each m, respectively.

In some implementations, rotary guided modes with m=1 (e.g., indicated by the black box in FIG. 3) may be included in the rotary optical beam generated by rotator fiber 220. Notably, this set of rotary guided modes extends to higher values of l (e.g., to l=20 and higher). As shown, the m=1 rotary guided modes have a pronounced annular shape with no nodes in any direction. In some implementations, rotary guided modes with slightly higher m (e.g., m=2, m=3, and/or the like) can also provide a useful annular beam, particularly for higher values of l. In some implementations, one or more of the rotary guided modes, included in the rotary optical beam, may have an l value that is greater than or equal to 10 (l≥10, such as l=15, l=18, l=20, and/or the like).

Additionally, or alternatively, the rotary optical beam may include light propagating in one or more rotary leaky waves. Leaky waves are a class of non-guided light in optical fibers (e.g., light that is not guided by the core of the optical fiber). Leaky wave light launched into a core of an optical fiber may escape into cladding of the optical fiber. However, in contrast to most non-guided light in fibers, the leaky wave light leaks relatively slowly from the core into the cladding.

Rotary leaky wave light, in particular, can have low loss over a relatively wide range of parameters. For example, in a step-index silica fiber with an NA of 0.10 and a core diameter of 50 micrometers (μm), rotary leaky wave light with wavelength of 1030 nanometers (λ=1030 nm) with no radial nodes and with a characteristic half-divergence angle θ such that sin(θ)=0.11 has a calculated loss of only 0.14 decibels per meter (dB/m). Thus, while rotary leaky waves do not satisfy the criterion for guided modes, rotary leak waves can be used in applications with output fiber lengths on the order of tens of meters or less, such as passive optical power delivery fibers and active amplifier fibers, where losses of up to a few dB can be acceptable. Similar to the case of rotary guided modes, rotary leaky waves have one definite rotation direction and no angular nodes, generally zero or few radial nodes, and may be included in the rotary optical beam generated by rotator fiber 220. In some implementations, one or more of the rotary leaky waves, included in the rotary optical beam, may have an l that is greater than or equal to 10 (l≥10, such as l=15, l=18, l=20, and/or the like).

In some implementations, rotary optical beam may comprise a combination of one or more rotary guided modes and/or one or more leaky waves. In some implementations, in a case where the input optical beam is a single mode optical beam, rotator fiber 220 can be designed such that the rotary optical beam comprises a relatively pure (e.g., greater than approximately 50% purity, greater than approximately 80% purity, and/or the like) single rotary guided mode or rotary leaky wave with a particular value of l. In other words, in some implementations, rotator fiber 220 can be designed such that at least 50% of input power, associated with the input optical beam, is converted to a single rotary guided mode or a single rotary leaky wave in the output optical beam. As described above, the rotary optical beam (e.g., including one or more rotary guided modes and/or one or more rotary leaky waves) has an annular shape at an output end of rotator fiber 220.

Returning to FIG. 2, output fiber 230 includes an optical fiber for receiving an output optical beam (e.g., a rotary optical beam) launched by rotator fiber 220. In some implementations, output fiber 230 may be a step-index optical fiber, a graded-index optical fiber, or a fiber with a specialized index profile, such as an annular-core fiber that is designed to carry a rotary optical beam with minimal coupling into other modes or leaky waves, and/or that is designed to provide a preferred radial intensity profile. In some implementations, output fiber 230 can be omitted if, for example, an output of the system is to be coupled directly into free-space (e.g., rather than into fiber).

The number and arrangement of elements shown and described in association with FIG. 2 are provided as examples. In practice, environment 200 may include additional elements, fewer elements, different elements, differently arranged elements, and/or differently sized elements than those shown in FIG. 2.

Figure 4A:
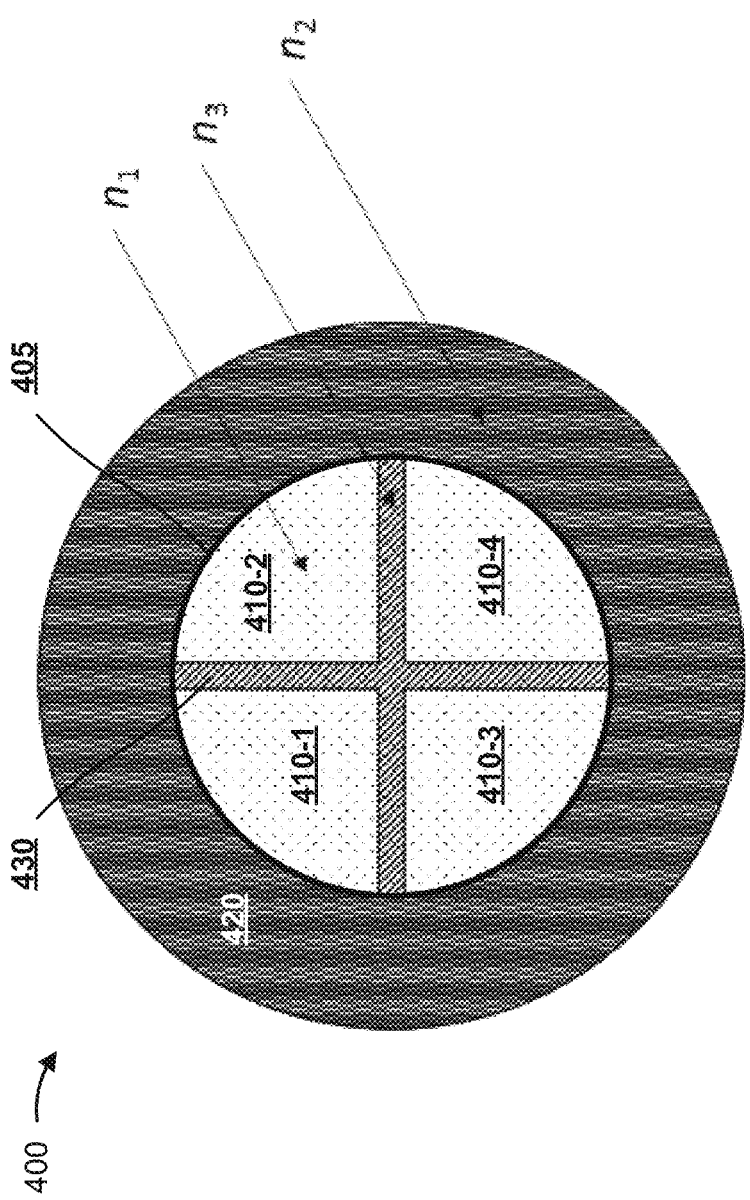
FIGS. 4A and 4B are diagrams of cross-sections of example rotator fibers for generating rotary optical beams.
Figure 4B:
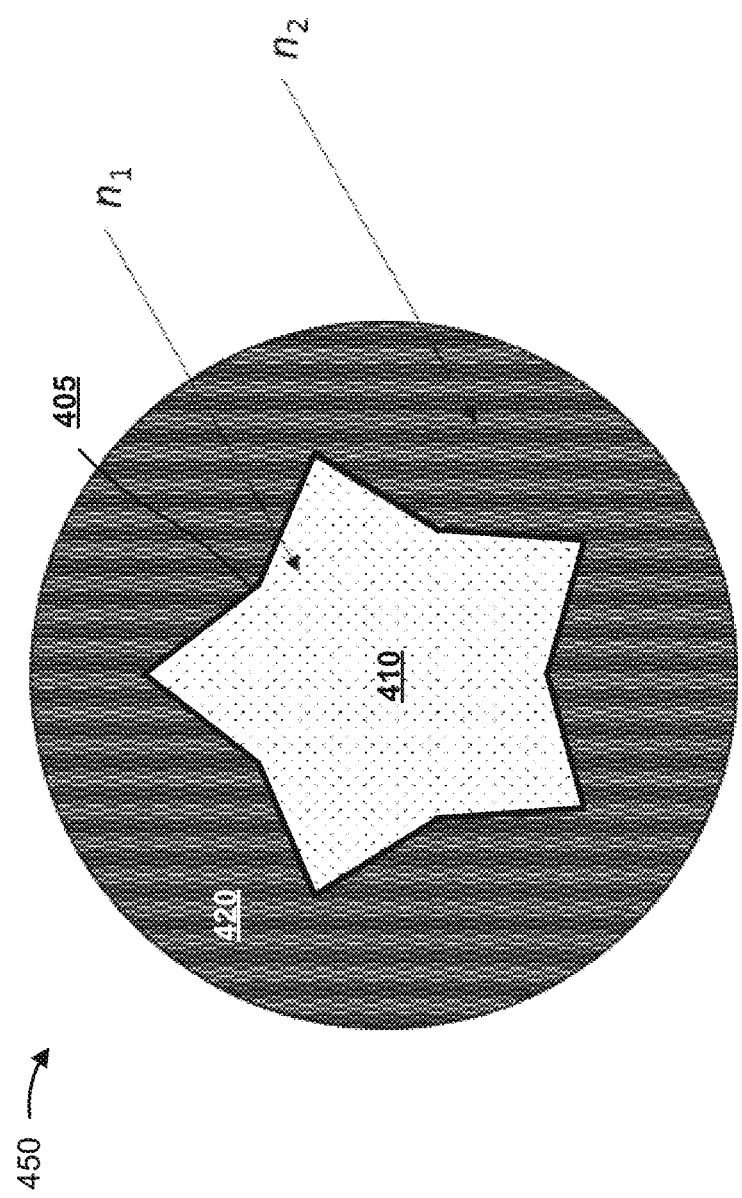

FIGS. 4A and 4B are diagrams of cross-sections 400 and 450, respectively, of example rotator fibers 220 for generating rotary optical beams.

As shown in FIG. 4A, in some implementations, rotator fiber 220 may include a unitary core 405 that includes primary section 410 with refractive index $n_1$ (e.g., sections 410-1, 410-2, 410-3, and 410-4 in the example shown in FIG. 4A) and a secondary section 430 with a refractive index $n_3$. Unitary core 405 is described as unitary in that the sections of unitary core 405 (e.g., primary section 410 and secondary section 430) touch one another such that the sections of unitary core 405 form a single unit within rotator fiber 220. As further shown, rotator fiber 220 may include a cladding 420, with a refractive index $n_2$, that surrounds unitary core 405. In some implementations, as illustrated in cross-section 400, secondary section 430 may be arranged in unitary core 405 such that at least a portion of secondary section 430 is offset from a center of unitary core 405.

In some implementations, unitary core 405 may twist around an optical axis of rotator fiber 220 (e.g., a center of rotator fiber 220) along a length of rotator fiber 220 (e.g., in the manner described above and as illustrated in FIG. 1B). In some implementations, a rate of twist about the optical axis increases from a first rate of twist toward a first end of rotator fiber 220 (e.g., an end proximate to an input fiber 210) to a second rate of twist toward a second end of rotator fiber 220 (e.g., an end proximate to an output fiber 230). For example, the rate of twist toward an input end of rotator fiber may increase from zero or near zero twists per mm (e.g., a rate of twist that is less than or equal to approximately 0.02 twists per mm (approximately one twist per 50 mm)), to approximately 0.17 twists per mm (approximately one twist per 6 mm) or more toward an output end of rotator fiber 220.

In some implementations, rotator fiber 220 may be tapered such that a size (e.g., a diameter) of unitary core 405 substantially matches a size of a core of input fiber 210 and/or output fiber 230 at respective ends of rotator fiber 220.

Figure 5:
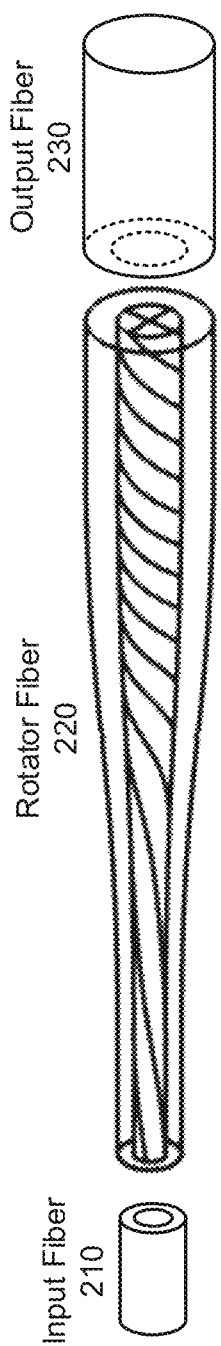
FIG. 5 is a diagram illustrating an example tapered rotator fiber described herein.

FIG. 5 is a diagram illustrating an example tapered rotator fiber 220. As shown in FIG. 5, in some implementations, rotator fiber 220 may be tapered such that a size of rotator fiber 220 at an input end of rotator fiber 220 (e.g., an end spliced to input fiber 210, where the twist rate is at or near zero) is smaller than a size of rotator fiber 220 at an output end of rotator fiber 220 (e.g., an end spliced to output fiber 230, where the twist rate is increased as compared to the input end).

As further shown in FIG. 5, a rate of twist at which unitary core 405 twists about the optical axis may increase from a first rate of twist (e.g., a twist rate of zero or near zero) toward an input end of rotator fiber 220 to a second rate of twist toward an output end of rotator fiber 220. As indicated above, FIG. 5 is provided merely as an example. Other examples are possible and may differ from what is described with regard to FIG. 5. Although rotator fiber 220 is illustrated as being straight in FIG. 5, rotator fiber 220 may have any shape.

Returning to FIG. 4A, in some implementations, $n_1$ is greater than $n_2$ and $n_3$, and $n_3$ is greater than or equal to $n_2$ ($n_2 \leq n_3 < n_1$). In other words, $n_1$ is different from (e.g., greater than) $n_3$ and $n_2$, and $n_3$ may be different from (e.g., greater than or equal to) $n_2$. This relationship among refractive indices of rotator fiber 220 facilitates generation of the rotary optical beam as light propagates through rotator fiber 220. For example, most of the input optical beam may be launched in primary section 410 (with refractive index $n_1$), while a portion of the input optical beam may be launched in secondary section 430 (with refractive index $n_3$). Here, since both $n_1$ and $n_3$ are greater than $n_2$ (the refractive index of cladding 420), the light launched in unitary core 405 (e.g., primary section 410 and secondary section 430) may be guided by cladding 420. Further, since $n_3$ is less than $n_1$, secondary section 430 somewhat guides the light in the separate sections of primary section 410, and will twist the light about the optical axis of rotator fiber 220 along the length of rotator fiber 220 as unitary core 405 twists about the optical axis, thereby generating the rotary optical beam.

In some implementations, as illustrated in example cross-section 400, secondary section 430 may separate primary section 410 into at least two sections (e.g., such that secondary section 430 is between sections of primary section 410). In some implementations, unitary core 405 may include a primary section 410 with at least two sections (e.g., two sections, three sections, four sections, six sections, and/or the like). In some implementations, at least two of the sections of primary section 410 may have approximately equal cross-sectional areas. Additionally, or alternatively, at least two of the sections of primary section 410 may have different cross-sectional areas.

In some implementations, as illustrated in example cross-section 400, a cross-section of secondary section 430 may be symmetric with respect to the optical axis of rotator fiber 220. Alternatively, a cross-section of secondary section 430 may be asymmetric with respect to the optical axis of rotator fiber 220, in some implementations.

In some implementations, secondary section 430 may comprise at least three portions, where the at least three portions extend in directions that are perpendicular to the optical axis of rotator fiber 220 in a plane of a cross-section of rotator fiber 220. In some implementations, a direction in which one of the at least three portions extends may be perpendicular to a direction in which another of the at least three portions extends. For example, with reference to cross-section 400, secondary section 430 may include a horizontal portion, a first vertical portion (e.g., a vertical portion above the horizontal portion of secondary section 430 in FIG. 4A), and a second vertical portion (e.g., a vertical portion below the horizontal portion of secondary section 430 in FIG. 4A). Here, as shown, the horizontal portion, the first vertical portion, and the second vertical portion extend in directions that are perpendicular to the optical axis of rotator fiber 220 in a plane of a cross-section of rotator fiber 220. As further shown in FIG. 4A, the direction in which the horizontal portion extends is perpendicular to the direction in which the first vertical portion extends, and the direction in which the horizontal portion extends is perpendicular to the direction in which the second vertical portion extends.

Notably, example cross-section 400 is provided as merely as an example. Generally, unitary core 405 (e.g., comprising primary section 410 and secondary section 430) may have a refractive index structure that angularly varies with respect to the optical axis of rotator fiber 220, where unitary core 405 twists about the optical axis along the length of rotator fiber 220. In example cross-section 400, the angularly varying refractive index structure is that of the "+" shaped secondary section 430 in unitary core 405, surrounded by cladding 420. In this example, secondary section 430 forms complete dividers such that sections of primary section 410 are separated by secondary section 430.

Another example of the angularly varying refractive index structure may include a rotator fiber 220 in which primary section 410 includes a different number of sections, separated by secondary section 430, than shown in FIG. 4A. In some implementations, a symmetry of secondary section 430, associated with the refractive index structure of unitary core 405, may be selected based on a desired rotary guided mode to be included in the rotary output beam. For example, in case where the rotary guided mode with l=8 is desired, then a symmetry of secondary section 430 about the optical axis of rotator fiber 220 may be selected such that the refractive index structure of unitary core 405 forms a symmetric eight-bladed divider (e.g., such that primary section 410 comprises eight sections). Generally, the symmetry of secondary section 430 may preferentially create modes with l that is equal the value of l, or a multiple thereof. For example, if rotator fiber 220 includes a secondary section 430 that forms a symmetric four-bladed divider (e.g., such that primary section 410 comprises four sections, as shown in cross-section 400), then modes with l=4 may be preferentially excited, as well as modes with l values that are multiples of four, such as l=0, l=8, l=12, l=16, and/or the like.

Yet another example of the angularly varying refractive index structure may include a rotator fiber 220 in which secondary section 430 causes unitary core 405 to have an asymmetric cross-sectional shape with respect to the optical axis of rotator fiber 220 (e.g., without separating primary section 410 into multiple sections).

Still other examples of the angularly varying refractive index structure may include a rotator fiber 220 in which primary section 410 and/or secondary section 430 comprise a graded-index material, a rotator fiber 220 in which secondary section 430 forms partial dividers (e.g., as compared to complete dividers shown in example cross-section 400, such as a secondary section 430 that spans approximately 85% of the inner diameter of cladding 420, thereby forming unitary core 405 to include a single, interconnected primary section 410), a rotator fiber 220 including off-center round inclusions in unitary core 405, and/or the like.

As another example, and as shown in example cross-section 450 of FIG. 4B, rotator fiber 220 may not include secondary section 430, in some implementations (e.g., rotator fiber 220 may not include any material with refractive index $n_3$). In other words, in some implementations, unitary core 405 may include only primary section 410. In such a case, the angular variation of the refractive index structure may be defined by a non-circular shape of primary section 410 within cladding 420 (e.g., a five-pointed star shaped primary section 410 is shown in example cross-section 450). Generally, a perimeter of the non-circular shape of primary section 410 may be at least partially concave (e.g., the five-pointed star shaped primary section 410 includes five concave portions). In such a case, the non-circular shape of unitary core 405 may twist along the length of rotator fiber 220 (e.g., such that the points of the five-pointed star rotate about the optical axis of rotator fiber 220 along the length of rotator fiber 220). Here, due to the non-circular unitary core 405 twisting about the optical axis, light propagating in the non-circular unitary core 405 (e.g., light propagating in or near the points of the five-pointed star shown in example cross-section 450) is twisted about the optical axis of rotator fiber 220 along the length of rotator fiber 220, thereby generating the rotary optical beam. In some implementations, rotator fiber 220 including a non-circular unitary core 405 (i.e., a non-circular primary section 410) may be tapered such that a size of unitary core 405 substantially matches a size of a core region of input fiber 210 and/or output fiber 230 at respective ends of rotator fiber 220.

As indicated above, FIGS. 4A and 4B are provided merely as examples. Other examples are possible and may differ from what is described with regard to FIGS. 4A and 4B.

In some implementations, rotator fiber 220 with an angularly-varying cross section can be fabricated using a rod-in-tube preform assembly method, whereby a rotator fiber 220 preform is fabricated (e.g., using multiple discrete pieces of glass, each with the appropriate refractive index). The rotator fiber 220 preform may then be fused together near a melting point of the glass. A twist can be implemented during a fiber draw process using a preform spinning technique (e.g., similar to that used in some polarization-maintaining, low-birefringence, or chirally-coupled-core fibers), or after the fiber draw process by twisting a short length of rotator fiber 220 while heating rotator fiber 220 (e.g., during fusion-tapering). Additional details regarding fabrication of rotator fiber 220 are described below with regard to FIGS. 6 and 7.

In operation, rotator fiber 220 may receive an optical beam at a first end of rotator fiber 220. As the optical beam propagates through rotator fiber 220, rotator fiber 220 may at least partially convert the optical beam to a rotary optical beam, and may output the rotary optical beam to output fiber 230.

In some implementations, modes of rotator fiber 220 follow the twisting pattern of the angularly varying refractive-index structure, meaning that, as light propagates through rotator fiber 220, the modes inherently tend to have a rotary character. As a result, when rotator fiber 220 is spliced into output fiber 230, light launched into output fiber 230 may be in a rotary state comprising one or more rotary guided modes and/or one or more rotary leaky waves. The rate of twist ($\Phi$, in units of rotations per meter, for example) at an output end of rotator fiber 220 determines an output divergence half-angle $\theta$ and an approximate rotational state of the rotary optical beam according to the following relations:

$\sin(\theta) \sim 2\sigma n_1 R \Phi$ $l \sim 2\sigma R \sin(\theta)/\lambda$ where R is an effective radius of the rotary guided mode(s) and/or rotary leaky wave(s), typically being approximately 10% less than a radius of unitary core 405. Thus, for example, using a 100 μm core diameter rotator fiber 220 with a rotational pitch of 6 mm, a core refractive index 1.450 (e.g., as is typical of fused silica glass), and an operating wavelength of $\lambda$=1080 nm, the effective radius is approximately $45 \times 10^{-6}$ m (e.g., R~90% ×(100/2)=$45 \times 10^{-6}$ m). Here, the twist rate is 166.7 rotations per meter (e.g., 1/(6 mm)=166.7), and so it follows that $\sin(\theta)$~0.068 radians and l is approximately equal to 18 (e.g., l~18).

The rotational state of 18 describes a highly rotary beam, and the output divergence of ~0.068 radians is typical of a fiber-delivered laser beam in industrial applications. The BPP is 3.1 mm-mrad (e.g., 45×0.068=3.1 mm-mrad), which is suitable for thin-metal processing, while with the annular beam shape is also suited for thick-metal processing.

As with any optical fiber, the light-guiding capability of rotator fiber 220 is defined by the NA of rotator fiber 220, where $NA=\sqrt{(n_1^2-n_2^2)}$. For the above example, in order to carry the rotary optical beam as a rotary guided mode or as rotary guided modes, the NA of rotator fiber 220 should be at least 0.068. Thus, the value of $n_2$ should be 1.4484 or less, as is achievable using, for example, doped fused silica. Alternatively, if it is desired to carry the rotary optical beam as a rotary leaky wave, then a value of NA slightly smaller than 0.068 can be used (e.g., a value in a range from approximately 0.060 to approximately 0.067). In some implementations, output fiber 230 should also have a suitable NA for conducting the rotary optical beam as rotary guided modes and/or rotary leaky waves.

In some implementations, the quality of coupling of input fiber 210 into rotator fiber 220 may determine how efficiently input power (e.g., non-rotary) is converted into high-brightness rotary light power at an output of rotator fiber 220 (e.g., as opposed to being scattered out of rotator fiber 220 or propagated as non-rotary light of degraded beam quality including, for example, many different modes). In order to ensure such high-efficiency beam conversion, all transitions should be smooth and adiabatic, specifically in three aspects.

A first aspect associated with providing adiabatic transitions is that core sizes at transitions from input fiber 210 to rotator fiber 220 and from rotator fiber 220 to output fiber 230 should be substantially matching so that modes and/or leaky waves are transferred without significant mode scrambling. Thus, in a case where a core of input fiber 210 and a core of output fiber 230 are different sizes, rotator fiber 220 should be tapered such that a core size of rotator fiber 220 at an input end and a core size of rotator fiber 220 at an output end substantially matches those of input fiber 210 and output fiber 230, respectively (e.g., as described above with regard to FIG. 5). In some implementations, a rate of the taper may be gradual enough to enable an adiabatic transition. In some implementations, a square-root taper profile may be used in order to enable a relatively short taper while still remaining adiabatic.

Another aspect associated with providing adiabatic transitions is that the rate of twist of rotator fiber 220 should be zero or near zero at an input end of rotator fiber 220 (e.g., an end nearest to input fiber 210) and should gradually increase along the length of rotator fiber 220. For example, the rate of twist of rotator fiber 220 near input fiber 210 may correspond to a rotational state l of approximately 2 or less, 0.5 or less, and/or the like. In some implementations, the rate of twist may increase along the length of rotator fiber 220 to a maximum rate of twist near an output end of rotator fiber 220 (e.g., an end nearest to output fiber 230). Here, the rate of change of the rate of twist should be gradual enough to enable an adiabatic transition. Notably, the rate of twist does not go to zero or near zero near output fiber 230 (e.g., since neither input fiber 210 nor output fiber 230 have an angular-varying refractive index structure there is no intrinsic amount of twist, and these fibers will transmit light with a given rotational state that is launched into these fibers (so long as the rotational state is below cutoff for that fiber)).

Still another aspect associated with providing adiabatic transitions is that light that is directly launched into secondary section 430 (if included in rotator fiber 220) from input fiber 210 should be subsequently captured by primary section(s) 410 so that this light also acquires rotary characteristics. In some implementations, this effect can be achieved when a size of rotator fiber 220 is tapered upward from input fiber 210 to output fiber 230. Thus, in order to satisfy the first aspect described above, a core size of output fiber 230 should be larger than a core size of input fiber 210. Light initially launched into secondary section 430 may be guided by cladding 420, but this light traverses without guiding across primary section 410 and secondary section 430. When the core size of rotator fiber 220 tapers upward toward output fiber 230, a divergence angle of this light decreases inversely to the core size (as is known for any optical fiber taper), causing more and more of this light to become trapped within primary section 410 as the divergence angle drops below the NA defined by the refractive index of primary section 410 and a refractive index of secondary section 430 interface (i.e., an $n_1$-$n_3$ interface). In some implementations, with a suitable design of rotator fiber 220 and the associated taper ratio, at least 50% (e.g., 80%) of light launched into secondary section 430 can be captured by primary section 410 and acquire rotary character.

Figure 6:
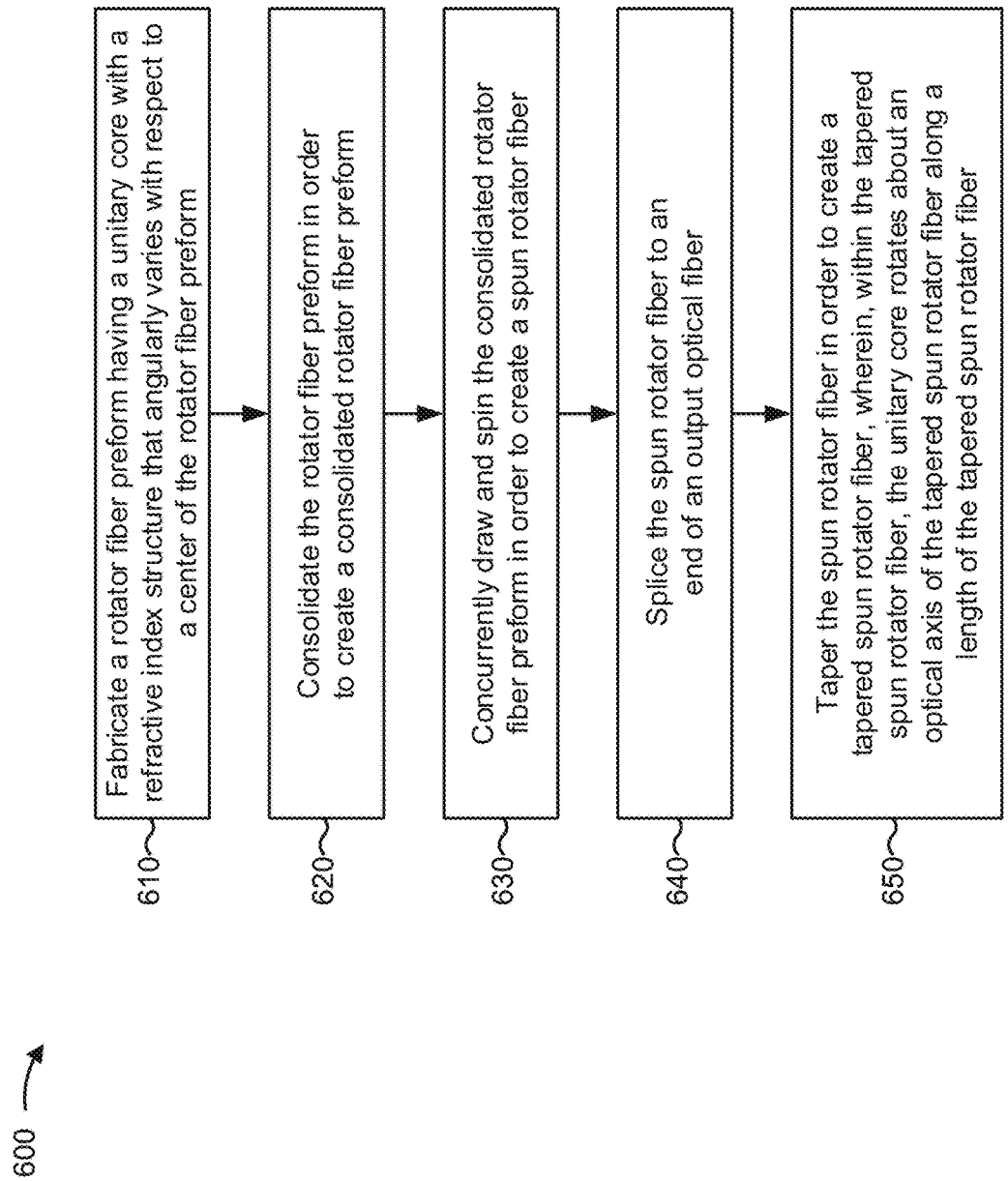
FIG. 6 is a flow chart of an example process of a spun fiber technique for fabricating a rotator fiber described herein.

FIG. 6 is a flow chart of an example process 600 of a spun-fiber technique for fabricating rotator fiber 220.

As shown in FIG. 6, process 600 may include fabricating a rotator fiber 220 preform having a unitary core with a refractive index structure that angularly varies with respect to a center of the rotator fiber 220 preform (block 610). For example, a preform for a fiber cross-sectional structure, such as that shown in FIG. 4A, may be fabricated using four quarter-round pieces of glass of index with refractive index of $n_1$ (e.g., forming primary section 410), at least three plates of glass with refractive index $n_3$ (e.g., forming secondary section 430), and a glass tube with refractive index $n_2$ (e.g., forming cladding 420). Other methods of fabricating a rotator fiber 220 preform are also possible.

As further shown in FIG. 6, process 600 may include consolidating the rotator fiber 220 preform in order to create a consolidated rotator fiber 220 preform (block 620). In some implementations, the rotator fiber 220 preform may be consolidated using a heat source (e.g., such that the pieces of glass of the rotator fiber 220 preform melt together). In some implementations, the rotator fiber 220 preform may be consolidated during the preforming process associated with block 610, or during a drawing and spinning process associated with block 630 described below.

As further shown in FIG. 6, process 600 may include concurrently drawing and spinning the consolidated rotator fiber 220 preform in order to create a spun rotator fiber 220 (block 630). In some implementations, the consolidated rotator fiber 220 preform may be secured in a preform spinner on a fiber draw tower, and the consolidated rotator fiber 220 preform may be drawn while spinning (e.g., using conventional techniques associated with creating a so-called spun fiber) in order to create the spun rotator fiber 220.

In some implementations, a rate of spin relative to a fiber draw speed may determine a rate of twist in the spun rotator fiber 220. In some implementations, the rate of spin is selected such that the rate of twist in the spun rotator fiber 220 is that which is desired for the rotary optical beam. Typical rates of twist can be, for example, in a range from approximately 50 rotations per meter to approximately 2000 rotations per meter (although slower or faster rates may be used in some cases). In some implementations, the spun rotator fiber 220 is drawn down such that a size of a core (e.g., a diameter of unitary core 405) is approximately equal to, or slightly less than, a size of a core of output fiber 230.

As further shown in FIG. 6, process 600 may include splicing the spun rotator fiber 220 to an end of output fiber 230 (block 640). For example, an end of the spun rotator fiber 220 may be fusion-spliced onto an end of output fiber 230.

As further shown in FIG. 6, process 600 may include tapering the spun rotator fiber 220 in order to create a tapered spun rotator fiber 220, wherein, within the tapered spun rotator fiber 220, the unitary core rotates about an optical axis of the tapered spun rotator fiber 220 along a length of the tapered spun rotator fiber 220 (block 650).

In some implementations, a downward taper may be created in the spun rotator fiber 220 using a heat source (e.g., a torch, a fusion splicer, and/or the like) to heat and soften the spun rotator fiber 220 such that the size of the core of the spun rotator fiber 220 tapers down to be approximately equal to or slightly greater than a size of a core of input fiber 210. Here, the tapering inherently reduces the rate of twist of the tapered spun rotator fiber 220 (e.g., as illustrated in FIG. 5), such that a rate of twist at an input end of the tapered spun rotator fiber 220 may be zero or near zero, thus achieving a match to the typically non-rotary nature of light beam launched by input fiber 210.

As described above, the taper rate may be selected such that transitions of light propagating through the tapered spun rotator fiber 220 (e.g., from a first rotational state to a second rotational state) may be adiabatic or near-adiabatic in order to, for example, minimize brightness loss and/or maximize purity of rotational state(s) generated in the rotary optical beam by the tapered spun rotator fiber 220. More specifically, a rate of increase in size of the core, an increase of the rate of twist, and the transfer of light from cladding 420 into unitary core 405 should be sufficiently gradual to ensure adiabatic transitions. An adiabatic transition can be defined as one in which making the transition even more gradual does not result in significant performance improvement.

In some implementations, after tapering in order to create the tapered spun rotator fiber 220, the tapered spun rotator fiber 220 may be spliced (e.g., fusion-spliced) onto an end of input fiber 210.

As an example, using the previously provided values for a 100 μm core diameter tapered spun rotator fiber 220, a 100 μm core diameter output fiber 230 could be spliced onto rotator fiber 220, and an input end of the tapered spun rotator fiber 220 could be tapered to, for example, a 30 μm core diameter in order to match a 30 μm core input fiber 210. In this example, a rate of twist can be calculated to be reduced by this taper to 15 rotations per meter (e.g., $(30/100)^2 \times 166.7 = 15$ rotations per meter), resulting in a rotational state of approximately 0.18 (1~0.18) at an input end of rotator fiber 220, which is effectively non-rotary and is thus well-matched to a non-rotary input optical beam carried by input fiber 210. In some implementations, the core of input fiber 210 may be significantly smaller in size than the core of output fiber 230 (e.g., the size of the core of input fiber 210 may be less than or equal to approximately 30% of the size of the core of output fiber 230) so that rotator fiber 220 will have a zero or near zero rate of twist at an input end of rotator fiber 220.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In some implementations, a process of a spun-fiber technique for fabricating rotator fiber 220 may include fabricating a rotator fiber preform having a unitary core with a refractive index structure that angularly varies with respect to a center of the rotator fiber preform; consolidating the rotator fiber preform in order to create a consolidated rotator fiber preform; concurrently drawing and spinning the consolidated rotator fiber preform in order to create a spun rotator fiber; and tapering the spun rotator fiber in order to create a tapered spun rotator fiber, wherein, within the tapered spun rotator fiber, the unitary core rotates about an optical axis of the tapered spun rotator fiber along a length of the tapered spun rotator fiber. In some implementations, the tapering of the spun rotator fiber creates an adiabatic transition between an input fiber and the output fiber, and an adiabatic transition from a first rotational state to a second rotational state.

Figure 7:
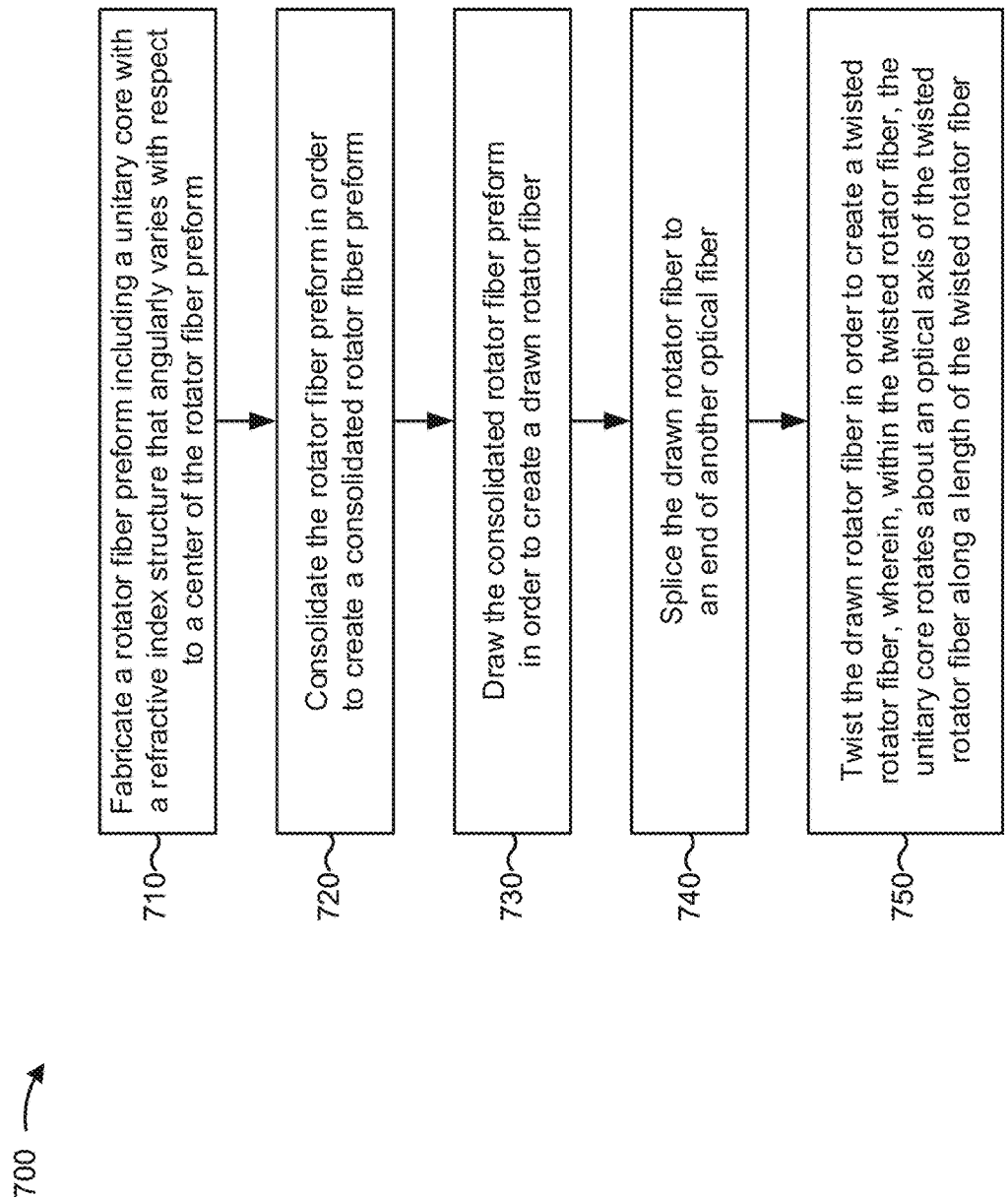
FIG. 7 is a flow chart of an example process of a twisted fiber technique for fabricating a rotator fiber described herein.

FIG. 7 is a flow chart of an example process 700 of a twisted fiber technique for fabricating rotator fiber 220.

As shown in FIG. 7, process 700 may include fabricating a rotator fiber 220 preform having a unitary core with a refractive index structure that angularly varies with respect to a center of the rotator fiber 220 preform (block 710). For example, the rotator fiber 220 preform may be fabricated in a manner similar to that described above in association with example process 600.

As further shown in FIG. 7, process 700 may include consolidating the rotator fiber 220 preform in order to create a consolidated rotator fiber 220 preform (block 720). For example, the rotator fiber 220 preform may be consolidated in a manner similar to that described above in association with example process 600.

As further shown in FIG. 7, process 700 may include drawing the consolidated rotator fiber 220 preform in order to create a drawn rotator fiber 220 (block 730). In some implementations, the consolidated rotator fiber 220 preform may be drawn using a conventional fiber drawing process, without spinning. In some implementations, the consolidated rotator fiber 220 preform may be drawn down such that a size of a core of the drawn rotator fiber 220 (e.g., a size of unitary core 405) is approximately equal to or slightly less than a size of a core of output fiber 230.

As further shown in FIG. 7, process 700 may include splicing the drawn rotator fiber 220 to an end of output fiber 230 (block 740). For example, an end of the drawn rotator fiber 220 may be fusion-spliced onto an end of output fiber 230.

As further shown in FIG. 7, process 700 may include twisting the drawn rotator fiber 220 in order to create a twisted rotator fiber 220, wherein, within the twisted rotator fiber 220, the unitary core rotates about an optical axis of the twisted rotator fiber 220 along a length of the twisted rotator fiber 220 (block 750).

In some implementations, the drawn rotator fiber 220 may be twisted while being heated and/or softened using a heat source (e.g., a torch, a fusion splicer, and/or the like) in order to create the twisted rotator fiber 220 with a variable rate of twist (e.g., a rate of twist that varies from zero or near zero at an input end of the twisted rotator fiber 220 to a desired rate of twist at an output end of the twisted rotator fiber 220). In some implementations, a taper profile can also be imparted to the twisted rotator fiber 220 so that a size of the twisted rotator fiber 220 matches both input fiber 210 and output fiber 230.

In some implementations, after twisting in order to create the twisted spun rotator fiber 220, the twisted rotator fiber 220 may be spliced (e.g., fusion-spliced) onto an end of input fiber 210.

Notably, process 700 may be somewhat more complicated than process 600 because of the need to generate a variable twist in the twisted rotator fiber 220, rather than a constant twist during the draw associated with the tapered spun rotator fiber 220. However, process 700 may provide additional degrees of freedom as compared to process 600. For example, process 700 may allow use of an input fiber 210 with a larger core size than that of output fiber 230. As another example, process 700 may allow the rate of twist of the input end of the twisted rotator fiber 220 to be zero (e.g., rather than near zero) as compared to process 600, where the rate of twist at the input end of the tapered spun rotator fiber is determined by the taper ratio in the spun-fiber technique. In some implementations, a hybrid approach is possible, where a spun rotator fiber 220 is modified by tapering and applying additional variable twist using a heat source in order to fine-tune (or completely remove) the rate of twist at the input end.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

In some implementations, a process of a twisted fiber technique for fabricating rotator fiber 220 may include fabricating a rotator fiber preform including a unitary core with a refractive index structure that angularly varies with respect to a center of the rotator fiber preform; consolidating the rotator fiber preform in order to create a consolidated rotator fiber preform; drawing the consolidated rotator fiber preform in order to create a drawn rotator fiber; and twisting the drawn rotator fiber in order to create a twisted rotator fiber, wherein, within the twisted rotator fiber, the unitary core rotates about an optical axis of the twisted rotator fiber along a length of the twisted rotator fiber. In some implementations, the process may further include softening the drawn rotator fiber with a heat source while twisting the drawn rotator fiber, wherein the drawn rotator fiber is twisted such that the twisted rotator fiber has a variable twist rate along the length of the twisted rotator fiber.

FIGS. 8A-8C are diagrams associated with example simulations using various taper lengths of rotator fiber 220. In the simulations associated with FIGS. 8A-8C, input fiber 210 has a 30 μm core and output fiber 230 has a 100 μm core. Rotator fiber 220 is a spun rotator fiber tapering with a parabolic profile from a 30 μm core to a 100 μm core, and has a rate of twist of 166.7 rotations/m at an output end of rotator fiber 220. Further, input fiber 210 carries six equally populated modes: $LP_{01}$, $LP_{02}$, $LP_{11(+)}$, $LP_{11(-)}$, $LP_{21(+)}$, and $LP_{21(-)}$, where (+) and (−) indicate the two possible rotational directions of the corresponding modes. The $LP_{11}$ mode and the $LP_{21}$ mode each have a small amount of rotation (l=1 and l=2, respectively), but since all six modes are equally populated, the input mode mixture has an average rotation state of zero. A NA of the cladding of rotator fiber 220 is 0.22 (e.g., so all relevant modes were strongly guided). A quality of the output optical beam is characterized by the number of modes excited.

Rotator fibers 220 of FIGS. 8A, 8B, and 8C are associated with taper lengths of 10 mm, 40 mm, and 80 mm, respectively, in order to assess adiabaticity of these taper lengths. The example simulations showed that output radiation was found to be almost entirely in the form of strongly rotary modes, $LP_{l1}$, as desired. Results are shown in FIGS. 8A-8C, showing the modal power as a function of rotational number l.

As shown, the rotational states generated by the above described rotator fiber are centered around 1~18. However, there is some distribution of states because more than one input mode was populated. Additionally, based on comparing FIG. 8A to FIGS. 8B and 8C, it can be seen that the 10 mm taper has considerably more states excited than the 40 mm taper and the 80 mm taper. This result indicates that the 10 mm taper may be too short to be adiabatic (i.e., that the 10 mm taper has too abrupt a change in the rotator fiber 220 parameters going from the input end to the output end), thereby causing additional modes to be excited and degrading brightness and modal purity.

On the other hand, as indicated by comparing FIGS. 8B and 8C, there is relatively little change between the 40 mm taper and the 80 mm taper. This indicates that both of these tapers are adiabatic and the resulting modal distribution is near optimal. Indeed, considering that six input modes were populated, in the ideal case six output modes would be populated. As can be seen, most of the output population in the adiabatic tapers is indeed captured within about six modes, with some slight spreading into neighboring modes.

Because all of the generated modes are rotary modes, an output spot, associated with an output of rotator fiber 220, may be a clean annulus pattern with a sharp edge, as desired for more effective material processing.

As indicated above, FIGS. 8A-8C are provided merely as examples. Other examples are possible and may differ from what is described with regard to FIGS. 8A-8C.

Figure 9A:
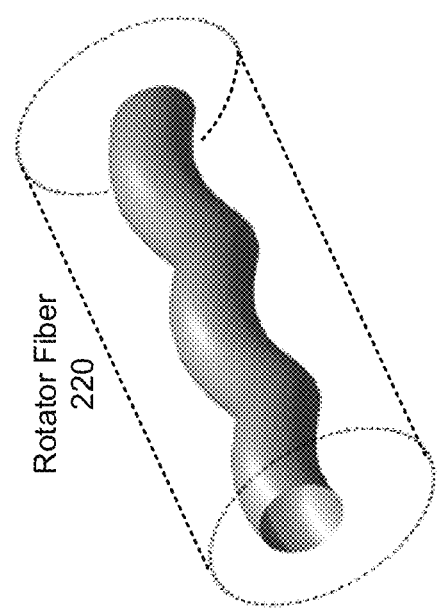
FIGS. 9A and 9B are diagrams of additional example rotator fibers for generating rotary optical beams.
Figure 9B:
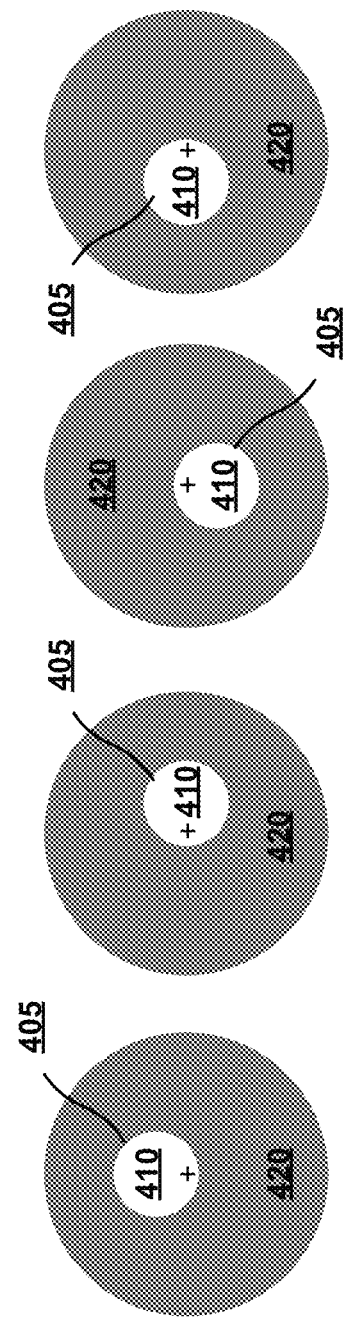

In some implementations, as described above, rotator fiber 220 may not include secondary section 430 (i.e., unitary core 405 may include only primary section 410), and a center of unitary core 405 (i.e., a center of primary section 410) may be offset from the optical axis of rotator fiber 220 along the length of rotator fiber 220 in association with at least partially converting an input optical beam to a rotary optical beam. FIGS. 9A and 9B are diagrams of an example rotator fiber 220 in which a center of unitary core 405 is offset from the optical axis of rotator fiber 220.

As shown in FIGS. 9A and 9B, in some implementations, unitary core 205 may include a single primary section 410, and a center of unitary core 405 (i.e., a center of the signal primary section 410) may be offset from the optical axis of rotator fiber 220. Such a unitary core 405 is herein referred to as an offset unitary core 405. In some implementations, the offset unitary core 405 may have a circular cross section (as shown in FIGS. 9A and 9B), a rectangular cross section, an elliptical cross section, a ring-shaped cross section, a partial ring shaped cross section, a wedge shaped cross section, or another shape. The example rotator fiber 220 shown in FIGS. 9A and 9B may represent, for example, an 80 μm diameter (highly multimode) unitary core 405 (e.g., with 0.22 NA and thousands of modes in a vicinity of a typical operating wavelength of approximately 1 μm, 1.5 μm, 1.9 μm, or the like) with a 10 μm axis offset relative to the central axis of cladding 420 (e.g., a 400 μm diameter cladding).

As shown in FIGS. 9A and 9B, the offset unitary core 405 may twist along the length of rotator fiber 220 (e.g., such that unitary core 405 rotates about the optical axis of rotator fiber 220 along the length of rotator fiber 220). In such a case, the angular variation of the refractive index structure may be defined by the offset of unitary core 405 with respect to the optical axis of rotator fiber 220. Here, due to the offset unitary core 405 twisting about the optical axis, light propagating in the offset unitary core 405 is twisted about the optical axis of rotator fiber 220 along the length of rotator fiber 220, which generates the rotary optical beam (e.g., including light propagating in at least one rotary guided mode or at least one rotary leaky wave), in a manner similar to that described above. In some implementations, the rotary optical beam may have an annular shape at the second end of rotator fiber 220, as described above.

In some implementations, a rate of twist at which the offset unitary core 405 twists about the optical axis increases from a first rate of twist at a first end of rotator fiber 220 to a second rate of twist at a second end of rotator fiber 220, as described above. In some implementations, the first rate of twist at the first end of rotator fiber 220 may be less than or equal to one twist per 50 mm. In some implementations, as shown in FIG. 9A, unitary core 405 being offset from the axis of rotator fiber 220 and being twisted about the axis of rotator fiber 220 along the length of rotator fiber 220 causes the offset unitary core 405 to have a helical shape.

In some implementations, rotator fiber 220 including an offset unitary core 405 (e.g., a single primary section 410 offset from the optical axis) may be tapered such that a size of unitary core 405 substantially matches a size of a core region of input fiber 210 and/or output fiber 230 at respective ends of rotator fiber 220. In some implementations, rotator fiber 220 may be tapered such that a size of rotator fiber 220 at the first end of rotator fiber 220 is smaller than a size of rotator fiber 220 at the second end of rotator fiber 220.

In some implementations, as shown in FIG. 9B, a thickness of cladding 420 surrounding the offset unitary core 405 is non-uniform at a given cross-section of rotator fiber 220 (due to the offset of the single primary section 410 from the optical axis). Thus, in some implementations, a cross-section of rotator fiber 220 including offset unitary core 405 may be asymmetric with respect to the optical axis of rotator fiber 220.

In some implementations, rotator fiber 220 including an offset unitary core 405 (e.g., including a single primary section 410) may be relatively simple to fabricate (e.g., as compared to the example rotator fiber shown in FIG. 4A). For example, a conventional preform with a centered core (e.g., a unitary core 405 comprising a single primary section 410) can be fabricated, and a portion of cladding 420 can be ground off such that unitary core 405 is off-centered. Next, a re-sleeve operation can be performed (if desired) to add additional cladding material while maintaining the off-axis position of unitary core 405. Alternatively, an undoped rod can be drilled with an off-center hole and a core rod or core/clad rod can be inserted into the off-center hole. This structure can then be consolidated and drawn to fiber. Notably, these processes are provided as examples, and other techniques can be used to fabricate the desired rotator fiber 220 with the offset unitary core 405.

In some implementations, an output end of the twisted offset unitary core 405 can be spliced into a suitable conventional, non-helical-core multimode output fiber 230 in such a way that the rotating character of the rotary optical beam is preserved. In some implementations, a radius of a core of output fiber 230 may match a maximum displacement of the offset unitary core 405. For example, with an 80 μm diameter, 10 μm-offset unitary core 405, a maximum displacement of unitary core 405 is 50 μm (e.g., 40 μm radius+10 μm offset=50 μm), and a majority of the light inside the offset unitary core 405 should be located near that 50 μm radius (due to centrifugal force). Therefore, in this example, a suitable matching output fiber 230 would be a 50 μm radius (i.e., 100 μm diameter) core fiber. Here, the rotating beam should transfer seamlessly from where it is confined at the outskirts of the offset unitary core 405 to the 50 μm radius of the core of output fiber 230.

In order to convert a non-rotary input optical beam at least partially into a rotary optical beam with maximum efficiency, the technique described above can be used. For example, rotator fiber 220 with the offset unitary core 405 can be tapered down and spliced onto input fiber 210. Using the numbers from the above example, if input fiber 210 has a 30 μm core, then rotator fiber 220 with the 80 μm offset unitary core 405 and 400 μm cladding 420 can be tapered down to a 30 μm core, 150 μm cladding. Input fiber 210 can be spliced onto rotator fiber 220 such that the core of input fiber 210 and the offset unitary core 405 are aligned. Here, since input fiber 210 may have a centered core, outer edges of the cladding of input fiber 210 and cladding 420 of rotator fiber 220 may not be aligned when the cores are aligned. As in the above example, output fiber 230 could have a 100 μm core. For ease of splicing, cladding of output fiber 230 could also be 400 μm, and the cladding of output fiber 230 and cladding 420 of rotator fiber 220 may be aligned.

Further, as described above, a pitch of the fiber rotation can be chosen to provide a desired beam rotation rate (which corresponds to a particular output NA), and a length of the taper can be chosen optimize output quality. For the above-described example, using a 6 mm rotation pitch, an 80 mm linear taper length is predicted to give a high-quality rotary beam for an input mode mix of 50% $LP_{01}$, 50% $LP_{02}$. Here, in both the near and far fields, a clear ring structure may be formed, meaning that a high proportion of rotary modes are excited. Modeling shows that rotational numbers of the excited modes range from approximately 8 to approximately 20, in agreement with modeled results described above.

Furthermore, as described above, the use of a tapered structure simultaneously provides a gradual transition from a non-rotary to a rotary state and a gradual transition from a smaller (e.g., 30 μm) input optical beam to a larger (e.g., 100 μm annular) output beam. In some implementations, a square-root taper pattern may be utilized.

In some implementations, rotator fiber 220 may be fabricated using a spun fiber technique (e.g., spinning a preform during a fiber draw) and then applying a non-spun taper, or can be fabricated by using a non-spun fiber and implementing a rotation during a taper process, as described above.

As with any rotary beam, care needs to be taken to avoid significant bend loss. Thus, the NA of cladding 420 of rotator fiber 220 including the offset unitary core 405 may be higher than the divergence of the rotary light generated. In the above example with a 6 mm pitch and a 100 μm output fiber 230, an output divergence (far-field radius) extends to approximately 0.10 radians. Here, using fibers with NA of 0.12 or greater (e.g., 0.15 or greater) should provide adequate margin to prevent bend loss.

Notably, the effect provided by offset unitary core 405 of rotator fiber 220 need not utilize a circular core. For example, one other implementation includes, starting with the "four-bladed" embodiment shown in FIG. 4A, and injecting light into only one of the primary sections 410. In this case there is effectively only a single primary section 410 carrying light, and this single primary section 410 is offset from the center of rotator fiber 220 (e.g., with a wedge apex being near the center and all the light-carrying area being away from the center).

As indicated above, FIGS. 9A and 9B are provided merely as examples. Other examples may differ from what is described with regard to FIGS. 9A and 9B.

FIG. 10 is a flow chart of an example process 1000 of a first technique for fabricating rotator fiber 220 including an offset unitary core 405.

As shown in FIG. 10, process 1000 may include obtaining a fiber preform including a core and a cladding surrounding the core, the core being approximately centered on a central axis of the fiber preform (block 1010). For example, a fiber preform including a circular core and a cladding surrounding the core may be obtained. Here, the core of the fiber preform may be approximately centered on a central axis of the fiber preform.

As further shown in FIG. 10, process 1000 may include removing a portion of the cladding surrounding the core along a length of the fiber preform (block 1020). For example, a portion of the cladding of the fiber preform may be ground off along the length of the fiber preform.

As further shown in FIG. 10, process 1000 may include re-sleeving the fiber preform in order to create a rotator fiber preform, wherein, within the rotator fiber preform, the center of the core is offset from the central axis of the rotator fiber preform (block 1030). For example, a re-sleeve operation can be performed to add cladding material to the fiber preform, while maintaining an off-axis position of the core relative to a (shifted) central axis of the fiber preform.

As further shown in FIG. 10, process 1000 may include creating rotator fiber 220 using the rotator fiber preform, wherein, within rotator fiber 220, a center of the core (e.g., unitary core 405) core is offset from the axis of rotator fiber 220 along a length of rotator fiber 220, and wherein, within rotator fiber 220, the offset unitary core 405 twists about the axis of rotator fiber 220 along the length of rotator fiber 220 (block 1040). In some implementations, rotator fiber 220 may be created using a spun fiber technique (e.g., including a concurrent draw and spin), as described above in association with FIG. 6. In some implementations, rotator fiber 220 may be created using a twisted fiber technique (e.g., including a draw and then a twist), as described above in association with FIG. 7.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
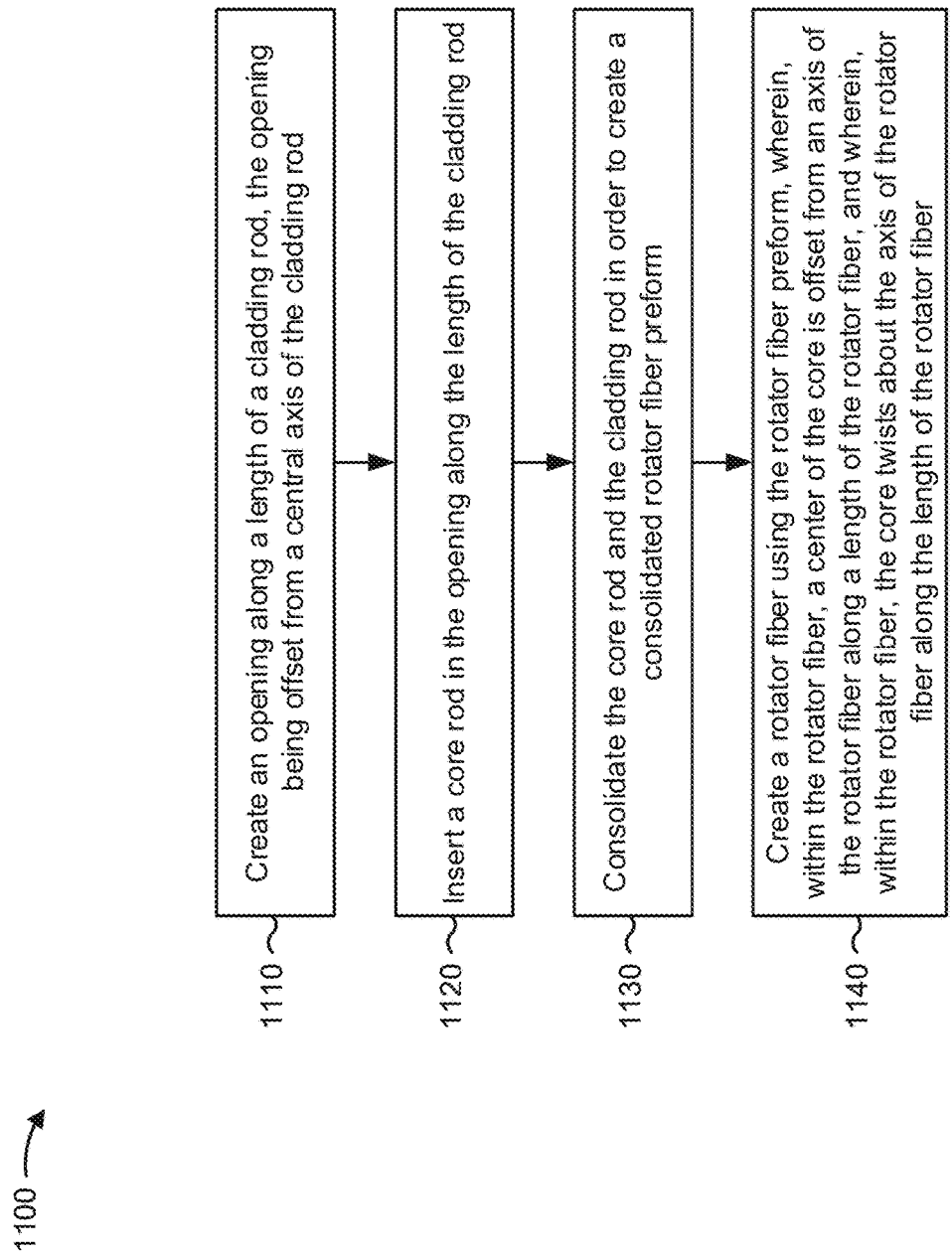

FIG. 11 is a flow chart of an example process 1100 of a second technique for fabricating rotator fiber 220 including an offset unitary core 405.

As shown in FIG. 11, process 1100 may include creating an opening along a length of a cladding rod, the opening being offset from a central axis of the cladding rod (block 1110). For example, an off-center hold can be drilled into an (undoped) cladding rod.

As further shown in FIG. 11, process 1100 may include inserting a core rod in the opening along the length of the cladding rod (block 1120). For example, a core rod can be inserted in the hole in the cladding rod along the length of the cladding rod.

As further shown in FIG. 11, process 1100 may include consolidating the core rod and the cladding rod in order to create a consolidated rotator fiber preform (block 1130). For example, the core rod and the cladding rod may be consolidated to form a preform of rotator fiber 220. In some implementations, the rotator fiber preform may be consolidated using a heat source (e.g., such that the pieces of glass of the rotator fiber 220 preform melt together). In some implementations, the rotator fiber preform may be consolidated during creating of rotator fiber 220 associated with block 1140 described below.

As further shown in FIG. 11, process 1100 may include creating rotator fiber 220 using the rotator fiber preform, wherein, within rotator fiber 220, a center of the core (e.g., unitary core 405) core is offset from the axis of rotator fiber 220 along a length of rotator fiber 220, and wherein, within rotator fiber 220, the offset unitary core 405 twists about the axis of rotator fiber 220 along the length of rotator fiber 220 (block 1140). In some implementations, rotator fiber 220 may be created using a spun fiber technique (e.g., including a concurrent draw and spin), as described above in association with FIG. 6. In some implementations, rotator fiber 220 may be created using a twisted fiber technique (e.g., including a draw and then a twist), as described above in association with FIG. 7.

Although FIG. 11 shows example blocks of process 1100, in some implementations, process 1100 may include additional blocks, fewer blocks, different blocks, or differently arranged blocks than those depicted in FIG. 11. Additionally, or alternatively, two or more of the blocks of process 1100 may be performed in parallel.

Some implementations described herein provide an optical fiber device for generating an optical beam with an annular beam shape directly in an optical fiber (i.e., without any free-space optics). More specifically, the generated optical beam is a rotary optical beam (i.e., an optical beam that propagates in the optical fiber in a helical direction), thereby generating an optical beam with an annular beam shape. In some implementations, the rotary character of the optical beam can be preserved (e.g., when the optical beam exits the optical fiber) such that a laser spot projected from the optical fiber onto a workpiece, for example, shows an annular beam profile with sharp edges and high beam quality.

The foregoing disclosure provides illustration and description, but is not intended to be exhaustive or to limit the implementations to the precise form disclosed. Modifications and variations are possible in light of the above disclosure or may be acquired from practice of the implementations.

For example, rotator fiber 220 has been described as being used for the purpose of converting a non-rotary optical beam into a rotary optical beam. However, in some applications, rotator fiber 220 may be used in a reverse direction in order to convert an input rotary optical beam into an output non-rotary optical beam. This may be achieved by reversing the design of rotator fiber 220, including the taper and the variation of twist, so that the rate of twist at an input end of rotator fiber 220 matches the rotation of the input optical beam, and so that the rate of twist at an output end of rotator fiber 220 is zero or near zero. Either of the fabrication techniques described above can be adapted to this example.

As another example, rotator fiber 220 may be designed in order to convert an input optical beam with any rotational state into an output optical beam with another (i.e., different) rotational state. The criterion for achieving this is that the rate of twist at the input end of rotator fiber 220 should match the rotational state of the input optical beam, and the rate of twist at an output end of rotator fiber 220 should match the desired rotational state of the output optical beam. Either of the fabrication techniques described above can be adapted to this example.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical fiber device, comprising:
 a core section that twists about an axis of the optical fiber device along a length of the optical fiber device,
  wherein a center of the core section is offset from the axis of the optical fiber device along the length of the optical fiber device,
  wherein a rate of twist at which the core section twists about the axis increases from a first rate of twist at a first end of the optical fiber device to a second rate of twist at a second end of the optical fiber device, and
  wherein the core section being twisted about the axis is to cause an optical beam, launched at the first end of the optical fiber device, to be at least partially converted to a rotary optical beam at a second end of the optical fiber device; and
 a cladding surrounding the core section.

2. The optical fiber device of claim 1, wherein a thickness of the cladding surrounding the core section is non-uniform at a cross-section of the optical fiber device.

3. The optical fiber device of claim 1, wherein a cross-section of the optical fiber device is asymmetric with respect to the axis of the optical fiber device.

4. The optical fiber device of claim 1, wherein the core section is a circular core section.

5. The optical fiber device of claim 1, wherein the core section being offset from the axis of the optical fiber device and being twisted about the axis of the optical fiber device along the length of the optical fiber device causes the core section to have a helical shape.

6. The optical fiber device of claim 1, wherein a core of the optical fiber device includes only the core section.

7. The optical fiber device of claim 1, wherein the optical fiber device includes a unitary core comprising a plurality of core sections including the core section.

8. The optical fiber device of claim 1, wherein the first rate of twist at the first end of the optical fiber device is less than or equal to one twist per 50 millimeters.

9. The optical fiber device of claim 1, wherein the optical fiber device is tapered such that a size of the optical fiber device at the first end of the optical fiber device is smaller than a size of the optical fiber device at the second end of the optical fiber device.

10. The optical fiber device of claim 1, wherein the rotary optical beam has an annular shape at the second end of the optical fiber device.

11. The optical fiber device of claim 1, wherein the rotary optical beam includes light propagating in at least one rotary guided mode or at least one rotary leaky wave.

12. A method, comprising:
receiving, by a rotator fiber, an optical beam at a first end of the rotator fiber,
  wherein the rotator fiber includes a core section that twists about an axis of the rotator fiber along a length of the rotator fiber such that a center of the core section is offset from the axis of the rotator fiber along the length of the rotator fiber,
    wherein a rate of twist at which the core section twists about the axis increases from a first rate of twist at a first end of the rotator fiber to a second rate of twist at a second end of the rotator fiber;
at least partially converting, by the rotator fiber, the optical beam to a rotary optical beam,
  wherein the optical beam is at least partially converted to the rotary optical beam as a result of the core section being twisted about the axis; and
outputting, by the rotator fiber, the rotary optical beam.

13. The method of claim 12, wherein a thickness of a cladding surrounding the core section is non-uniform at a cross-section of the rotator fiber.

14. The method of claim 12, wherein a cross-section of the rotator fiber is asymmetric with respect to the axis of the rotator fiber.

15. The method of claim 12, wherein the core section is a circular core section.

16. The method of claim 12, wherein the core section being offset from the axis of the rotator fiber and being twisted about the axis of the rotator fiber along the length of the rotator fiber causes the core section to have a helical shape.

17. The method of claim 12, wherein a core of the rotator fiber includes only the core section.

18. The method of claim 12, wherein the first rate of twist at the first end of the rotator fiber is less than or equal to one twist per 50 millimeters.

19. An annular beam generator, comprising:
an optical fiber device including:
  a core section that twists about an axis of the optical fiber device along a length of the optical fiber device, the core section being offset from the axis of the optical fiber device along the length of the optical fiber device,
    wherein a rate of twist at which the core section twists about the axis increases along the length of the optical fiber device from a first end of the optical fiber device to a second end of the optical fiber device; and
  a cladding surrounding the core section.

20. The annular beam generator of claim 19, wherein the core section being twisted about the axis is to cause an optical beam, launched at the first end of the optical fiber device, to be at least partially converted to a rotary optical beam at a second end of the optical fiber device.

* * * * *